(12) United States Patent
Matsukawa et al.

(10) Patent No.: US 11,208,324 B2
(45) Date of Patent: Dec. 28, 2021

(54) POLYCRYSTALLINE CUBIC BORON NITRIDE AND METHOD FOR MANUFACTURING THE SAME

(71) Applicant: SUMITOMO ELECTRIC HARDMETAL CORP., Itami (JP)

(72) Inventors: Michiko Matsukawa, Itami (JP); Satoru Kukino, Itami (JP); Taisuke Higashi, Itami (JP); Machiko Abe, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/052,920

(22) PCT Filed: Feb. 27, 2020

(86) PCT No.: PCT/JP2020/008149
§ 371 (c)(1),
(2) Date: Nov. 4, 2020

(87) PCT Pub. No.: WO2020/175642
PCT Pub. Date: Sep. 3, 2020

(65) Prior Publication Data
US 2021/0238036 A1  Aug. 5, 2021

(30) Foreign Application Priority Data

Feb. 28, 2019 (JP) .............................. JP2019-036261
Jan. 17, 2020 (WO) ................... PCT/JP2020/001436

(51) Int. Cl.
*C01B 21/064* (2006.01)
*B23B 27/14* (2006.01)

(52) U.S. Cl.
CPC ........ *C01B 21/0648* (2013.01); *B23B 27/148* (2013.01); *B23B 2226/125* (2013.01); *C01P 2002/60* (2013.01); *C01P 2002/76* (2013.01); *C01P 2004/03* (2013.01);
(Continued)

(58) Field of Classification Search
CPC ........................... C01B 21/0648; B23B 27/148
See application file for complete search history.

(56) References Cited

U.S. PATENT DOCUMENTS

| 4,289,503 A | 9/1981 | Corrigan |
| 2009/0169840 A1 | 7/2009 | Okamura et al. |

(Continued)

FOREIGN PATENT DOCUMENTS

| JP | S55-109278 A | 8/1980 |
| JP | S58-2269 A | 1/1983 |
| JP | S61-17406 A | 1/1986 |

(Continued)

*Primary Examiner* — James A Fiorito
(74) *Attorney, Agent, or Firm* — Faegre Drinker Biddle & Reath LLP

(57) ABSTRACT

A polycrystalline cubic boron nitride comprising 98.5% by volume or more of cubic boron nitride, wherein the cubic boron nitride has a dislocation density of more than $8 \times 10^{15}/m^2$, the polycrystalline cubic boron nitride comprises a plurality of crystal grains, and the plurality of crystal grains have a median diameter d50 of an equivalent circle diameter of 0.1 μm or more and 0.5 μm or less.

12 Claims, 3 Drawing Sheets

(52) U.S. Cl.
CPC ...... *C01P 2004/54* (2013.01); *C01P 2006/10* (2013.01); *C01P 2006/60* (2013.01)

(56) References Cited

U.S. PATENT DOCUMENTS

2014/0090309 A1\* 4/2014 Dumm ................ C01B 21/0648
                                                        51/309
2019/0248652 A1   8/2019 Ishida et al.

FOREIGN PATENT DOCUMENTS

| JP | H11-246271 A | 9/1999 |
|----|---|---|
| JP | 2006-201216 A | 8/2006 |
| JP | 2014-80323 A | 5/2014 |
| JP | 2015-202981 A | 11/2015 |
| WO | WO-2007/145071 A1 | 12/2007 |
| WO | WO-2018/066261 A1 | 4/2018 |

\* cited by examiner

POLYCRYSTALLINE CUBIC BORON NITRIDE AND METHOD FOR MANUFACTURING THE SAME

This application claims priority from Japanese Patent Application No. 2019-036261 filed on Feb. 28, 2019, and International Application PCT/JP2020/001436 filed on Jan. 17, 2020. The entire contents of the Japanese patent application and the international application are incorporated herein by reference.

TECHNICAL FIELD

The present disclosure relates to a polycrystalline cubic boron nitride and a method for manufacturing the same.

BACKGROUND ART

Cubic boron nitride (hereinafter, also referred to as "cBN") has a hardness that is second only to diamond, and also has excellent thermal stability and chemical stability. For this reason, cubic boron nitride sintered bodies have been used as a material for tools.

As the cubic boron nitride sintered body, a sintered body including about 10 to 40% by volume of a binder has been used. However, the binder causes the strength and thermal diffusivity of the sintered body to decrease.

To solve this problem, there has been developed a method in which sintering is conducted while simultaneously directly converting a hexagonal boron nitride into cubic boron nitride at ultrahigh pressure and high temperature without using a binder to obtain a binder-free cubic boron nitride sintered body.

Japanese Patent Laying-Open No. 11-246271 (Patent Literature 1) discloses a technique for obtaining a cubic boron nitride sintered body by directly converting and sintering a low-crystallinity hexagonal boron nitride into a cubic boron nitride sintered body under ultrahigh temperature and high pressure.

CITATION LIST

Patent Literature

PTL 1: Japanese Patent Laying-Open No. 11-246271

SUMMARY OF INVENTION

A polycrystalline cubic boron nitride of the present disclosure is a polycrystalline cubic boron nitride comprising 98.5% by volume or more of cubic boron nitride, wherein the cubic boron nitride has a dislocation density of more than $8 \times 10^{15}/m^2$, the polycrystalline cubic boron nitride comprises a plurality of crystal grains, and the plurality of crystal grains have a median diameter d50 of an equivalent circle diameter of 0.1 μm or more and 0.5 μm or less.

A method for manufacturing a polycrystalline cubic boron nitride of the present disclosure is a method for manufacturing the above-described polycrystalline cubic boron nitride, comprising:

a first step of preparing a hexagonal boron nitride powder;

a second step of heating and pressurizing the hexagonal boron nitride powder to a temperature greater than or equal to 1700° C. and less than or equal to 2500° C. and to a pressure greater than or equal to 8 GPa, with the temperature and the pressure passing through a temperature and a pressure in a stable region of a wurtzite boron nitride, to obtain a boron nitride polycrystalline body; and a third step of holding the boron nitride polycrystalline body obtained in the second step for 3 minutes or more and 60 minutes or less under conditions of a temperature of 1700° C. or more and 2500° C. or less and a pressure of 8 GPa or more to obtain the polycrystalline cubic boron nitride, wherein the stable region of wurtzite boron nitride is, when the temperature is represented as T° C. and the pressure as P GPa, a region that simultaneously satisfies the following Formula 1 and Formula 2, $$P \geq -0.0037T + 11.301 \qquad \text{Formula 1:}$$

$$P \leq -0.085T + 117 \qquad \text{Formula 2:}$$

in a heating and pressurizing path of the second step, an entry temperature into the stable region of wurtzite boron nitride is 500° C. or less, and the second step comprises a step of holding the temperature and the pressure in the heating and pressurizing path for 10 minutes or more at a temperature and a pressure in the stable region of wurtzite boron nitride.

DESCRIPTION OF EMBODIMENTS

Figure 1:
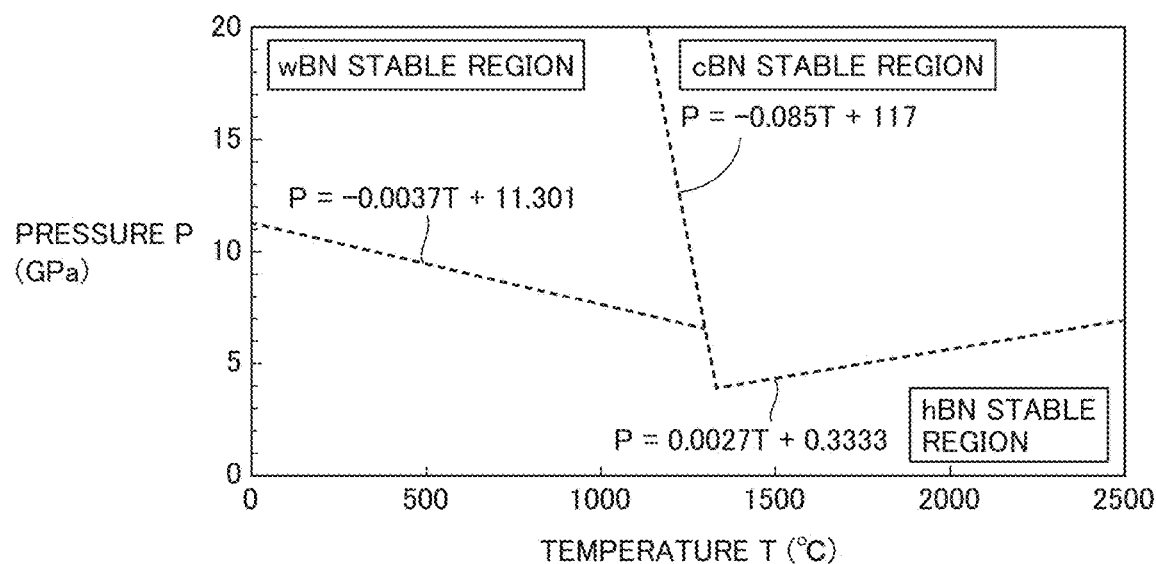
FIG. 1 is a pressure-temperature phase diagram of boron nitride.

Problem to be Solved by Present Disclosure

In recent years, in addition to iron materials, machining of materials that are difficult to cut, such as Ti alloy used for aircraft parts, is increasing. In general, when high load machining is carried out on a material that is difficult to cut, a blade edge tends to be damaged and tool life tends to be shortened. Therefore, there is a need for a tool capable of exhibiting an excellent tool life even in high load machining of an iron material or a material that is difficult to cut.

Accordingly, an object of the present invention is to provide a polycrystalline cubic boron nitride that can have a long tool life when used as a tool, particularly when used in high load machining of an iron material or a material that is difficult to cut.

Advantageous Effects of Present Disclosure

According to the present disclosure, the polycrystalline cubic boron nitride can have a long tool life when used as a tool, particularly when used in high load machining of an iron material or a material that is difficult to cut.

DESCRIPTION OF EMBODIMENTS OF PRESENT DISCLOSURE

First, the embodiments of the present disclosure will be listed and described.

(1) A polycrystalline cubic boron nitride of the present disclosure is a polycrystalline cubic boron nitride comprising 98.5% by volume or more of cubic boron nitride, wherein the cubic boron nitride has a dislocation density of more than $8\times10^{15}/m^2$, the polycrystalline cubic boron nitride comprises a plurality of crystal grains, and the plurality of crystal grains have a median diameter d50 of an equivalent circle diameter of 0.1 µm or more and 0.5 µm or less.

According to the present disclosure, the polycrystalline cubic boron nitride can have a long tool life when used as a tool, particularly when used in high load machining of an iron material or a material that is difficult to cut.

(2) The dislocation density is preferably $9\times10^{15}/m^2$ or more. By having such a dislocation density, the tool has better resistance to damage.

(3) It is preferable that the polycrystalline cubic boron nitride has a total content of an alkali metal element and an alkaline earth metal element of 10 ppm or less in terms of mass.

A tool using the polycrystalline cubic boron nitride can have an excellent tool life even for ultrafast high load machining of an iron material or a material that is difficult to cut.

(4) It is preferable that when a cross-section of the polycrystalline cubic boron nitride is observed at a magnification of 10000× using a scanning electron microscope, an area ratio of plate-like particles having an aspect ratio of 4 or more is 30% or less in terms of surface area. A tool using the polycrystalline cubic boron nitride can have an excellent tool life.

(5) It is preferable that the area ratio of the plate-like particles having an aspect ratio of 4 or more is 5% or less in terms of surface area. A tool using the polycrystalline cubic boron nitride can have even better excellent tool life.

(6) The polycrystalline cubic boron nitride preferably comprises 0.01% by volume or more of compressed hexagonal boron nitride. A tool using the polycrystalline cubic boron nitride can have an excellent tool life.

(7) The polycrystalline cubic boron nitride preferably comprises 0.1% by volume or more of wurtzite boron nitride. A tool using such a polycrystalline cubic boron nitride can have an excellent tool life.

(8) It is preferable that the dislocation density be calculated by using a modified Williamson-Hall method and a modified Warren-Averbach method. The dislocation density serves as a good correlation for the performance of the polycrystalline cubic boron nitride.

(9) It is preferable that the dislocation density be measured using synchrotron radiation as an X-ray source. The dislocation density serves as a good correlation for the performance of the polycrystalline cubic boron nitride.

(10) A method for manufacturing a polycrystalline cubic boron nitride of the present disclosure is a method for manufacturing the above polycrystalline cubic boron nitride, comprising:

a first step of preparing a hexagonal boron nitride powder;

a second step of heating and pressurizing the hexagonal boron nitride powder to a temperature greater than or equal to 1700° C. and less than or equal to 2500° C. and to a pressure greater than or equal to 8 GPa, with the temperature and the pressure passing through a temperature and a pressure in a stable region of a wurtzite boron nitride, to obtain a boron nitride polycrystalline body; and a third step of holding the boron nitride polycrystalline body obtained in the second step for 3 minutes or more and 60 minutes or less under conditions of a temperature of 1700° C. or more and 2500° C. or less and a pressure of 8 GPa or more to obtain the polycrystalline cubic boron nitride, wherein the stable region of wurtzite boron nitride is, when the temperature is represented as T° C. and the pressure as P GPa, a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

in a heating and pressurizing path of the second step, an entry temperature into the stable region of wurtzite boron nitride is 500° C. or less, and the second step comprises a step of holding the temperature and the pressure in the heating and pressurizing path for 10 minutes or more at a temperature and a pressure in the stable region of wurtzite boron nitride.

The polycrystalline cubic boron nitride obtained by this method for manufacturing can have a long tool life when used as a tool, particularly when used in high load machining of an iron material or a material that is difficult to cut.

(11) The entry temperature is preferably 300° C. or less. By setting to such an entry temperature, a tool using the obtained polycrystalline cubic boron nitride has an even better tool life.

(12) It is preferable that the second step comprises a step of holding the temperature and the pressure in the heating and pressurizing path for 15 minutes or more at a temperature and a pressure in the stable region of wurtzite boron nitride. By including this step, a tool using the obtained polycrystalline cubic boron nitride has an even better tool life.

(13) It is preferable that the second step comprises a step of, when the temperature is represented as T° C. and the pressure as P GPa, holding for 10 minutes or more at a temperature and a pressure in a region simultaneously satisfies the following Formula 1, Formula 2, and Formula 3.

$$P \geq -0.0037T + 11.301 \quad \text{Formula 1:}$$

$$P \leq -0.085T + 117 \quad \text{Formula 2:}$$

$$P \leq -0.0037T + 11.375 \quad \text{Formula 3:}$$

According to this, a tool using the obtained polycrystalline cubic boron nitride has an even better tool life.

Details of Embodiments of Present Disclosure

The polycrystalline cubic boron nitride of the present disclosure and a method for manufacturing thereof will now be described with reference to the drawings.

First Embodiment: Polycrystalline Cubic Boron Nitride

A polycrystalline cubic boron nitride according to an embodiment of the present disclosure will now be described.
<Polycrystalline Cubic Boron Nitride>

The polycrystalline cubic boron nitride of the present disclosure is a polycrystalline cubic boron nitride including 98.5% by volume or more of cubic boron nitride, wherein the polycrystalline cubic boron nitride has a dislocation density of more than $8 \times 10^{15}/m^2$, the polycrystalline cubic boron nitride includes a plurality of crystal grains, and the plurality of crystal grains have a median diameter d50 of an equivalent circle diameter of 0.1 µm or more and 0.5 µm or less.

The polycrystalline cubic boron nitride of the present disclosure is a sintered body, but since it is often intended that a sintered body include a binder, the term "polycrystalline body" is used in the present disclosure.

When used as a tool, the polycrystalline cubic boron nitride of the present disclosure can have a long tool life, particularly in high load machining of an iron material or a material that is difficult to cut. Although the reason for this is not clear, it is presumed to be as described in the following (i) to (iii).

(i) The polycrystalline cubic boron nitride of the present disclosure includes 98.5% by volume or more of cubic boron nitride, and does not substantially include a binder, a sintering aid, catalyst, and the like. Therefore, the cubic boron nitride grains are firmly bonded to each other, so that the strength and thermal diffusivity of the polycrystalline cubic boron nitride are improved. Therefore, a tool using the polycrystalline cubic boron nitride can have a long tool life even in high load machining of an iron material or a material that is difficult to cut.

(ii) In polycrystalline cubic boron nitride of the present disclosure, the dislocation density of the cubic boron nitride is more than $8 \times 10^{15}/m^2$. Since the polycrystalline cubic boron nitride has a relatively large number of lattice defects in the polycrystalline body and a large strain, strength is improved. Therefore, a tool using the polycrystalline cubic boron nitride can have a long tool life even in high load machining of an iron material or a material that is difficult to cut.

(iii) The polycrystalline cubic boron nitride of the present disclosure has a median diameter d50 (hereinafter, also referred to as "grain size") of an equivalent circle diameter of a plurality of crystal grains included therein of 0.1 µm or more and 0.5 µm or less. Conventionally, it was thought that as the grain size of the crystal grains decreases, strength increases, and the cutting performance of the polycrystalline cubic boron nitride improves. Therefore, although the grain size of the crystal grains constituting the polycrystalline cubic boron nitride is smaller (for example, average grain size of less than 100 nm), but this tended to reduce the toughness. On the other hand, since the polycrystalline cubic boron nitride of the present disclosure secures strength by increasing the dislocation density of the cubic boron nitride as described above in (ii), the grain size can be larger than previously. Therefore, the polycrystalline cubic boron nitride of the present disclosure can have improved toughness and excellent crack propagation resistance. Therefore, a tool using the polycrystalline cubic boron nitride can have a long tool life even in high load machining of an iron material or a material that is difficult to cut.

In the above description, the polycrystalline cubic boron nitride of the present disclosure has been described as having a long tool life in high load machining of an iron material and a material that is difficult to cut. However, the work material and the machining method are not limited to these. Examples of the work material include Ti alloys such as Ti6Al4V and cobalt-chromium alloys. Examples of the machining method include turning and milling.

<Composition>

The polycrystalline cubic boron nitride of the present disclosure includes 98.5% by volume or more of cubic boron nitride. As a result, the polycrystalline cubic boron nitride has excellent hardness, thermal stability, and chemical stability.

In addition to cubic boron nitride, the polycrystalline cubic boron nitride may include, within a range in which the effects of the present disclosure are exhibited, a total of 1.5% by volume or less of one or both of compressed hexagonal boron nitride and wurtzite boron nitride. Here, the term "compressed hexagonal boron nitride" refers to a substance having a crystal structure similar to that of ordinary hexagonal boron nitride, in which the interplanar spacing in the c-axis direction is smaller than that of ordinary hexagonal boron nitride (0.333 nm).

The polycrystalline cubic boron nitride may include unavoidable impurities within a range in which the effects of the present disclosure are exhibited. Examples of unavoidable impurities include hydrogen, oxygen, carbon, alkali metal elements (in the present specification, the alkali metal elements include lithium (Li), sodium (Na), potassium (K)) and alkaline earth metal elements (in the present specification, the alkaline earth metal elements include calcium (Ca), magnesium (Mg), strontium (Sr), and barium (Ba)), silicon (Si), and aluminum (Al). When the polycrystalline cubic boron nitride includes unavoidable impurities, the content of the unavoidable impurities is preferably 0.1% by mass or less. The content of the unavoidable impurities can be measured by secondary ion mass spectrometry (SIMS).

The total content of alkali metal elements (lithium (Li), sodium (Na), potassium (K)) and alkaline earth metal elements (calcium (Ca), magnesium (Mg), strontium (Sr), and barium (Ba)) in the polycrystalline cubic boron nitride is preferably not more than 10 ppm. Among the above-described unavoidable impurities, the alkali metal elements and alkaline earth metal elements have a catalytic action on the phase conversion between hexagonal boron nitride and cubic boron nitride. When the total content of alkali metal elements and alkaline earth metal elements in the polycrystalline cubic boron nitride is 10 ppm or less, for a tool using the polycrystalline cubic boron nitride, even when the interface between the blade edge and the work material under the cutting environment is exposed to high temperature and high pressure, it is possible to better suppress the progress of damage to the tool due to conversion of a part of the cubic boron nitride constituting the tool into hexagonal boron nitride. The lower limit of the total content of alkali metal elements and the alkaline earth metal elements in the hexagonal boron nitride polycrystalline body is preferably 0 ppm. That is, the total content of alkali metal elements and alkaline earth metal elements in the hexagonal boron nitride polycrystalline body is preferably 0 ppm or more and 10 ppm or less.

A conventional cubic boron nitride sintered body is prepared by using, for example, as described in, Japanese Patent Laying-Open No. 2006-201216, cBN abrasive grains as a starting material. Here, the total content of the catalyst component (alkali metal elements and alkaline earth metal elements) remaining in the cBN abrasive grains (content of catalyst component in 1 mol of cBN) is $2.4 \times 10^{-4}$ to $13.5 \times 10^{-4}$ mol. Therefore, to a skilled person in the art, it is obvious that the total content of the catalyst component of a conventional polycrystalline cubic boron nitride obtained by sintering such cBN abrasive grains is 0.01% by mass (100 ppm) or more.

On the other hand, as described later, for the polycrystalline cubic boron nitride of the present disclosure, hexagonal boron nitride is used as the starting material, and the hexagonal boron nitride is converted into cubic boron nitride by heating and pressurizing, without using a catalyst. Therefore, the content of the catalyst component in the polycrystalline cubic boron nitride can be 10 ppm or less in terms of mass.

The total content of silicon (Si) and aluminum (Al) in the polycrystalline cubic boron nitride is preferably 50 ppm or less in terms of mass. By setting in this range, for a tool using the polycrystalline cubic boron nitride, even when the interface between the blade edge and the work material under the cutting environment is exposed to high temperature and high pressure, it is possible to better suppress the progress of damage to the tool due to a part of the cubic boron nitride constituting the tool reacting with Si or Al.

The polycrystalline cubic boron nitride preferably does not substantially include a binder, a sintering aid, a catalyst or the like. This improves the strength and thermal diffusivity of the polycrystalline cubic boron nitride.

The cubic boron nitride content in the polycrystalline cubic boron nitride is preferably 98.5% by volume or more and 100% by volume or less, and further preferably 99% by volume or more and 100% by volume or less. The upper limit of the cubic boron nitride content can be 100% by volume or less, 99.99% by volume or less, 99.9% by volume or less, or 99.89% by volume or less.

The total content of compressed hexagonal boron nitride and wurtzite boron nitride in the polycrystalline cubic boron nitride is preferably 0% by volume or more and 41.5% by volume or less, preferably 0% by volume or more and 1% by volume or less, and preferably 0% by volume. That is, it is preferable that the polycrystalline cubic boron nitride does not include any of compressed hexagonal boron nitride and wurtzite boron nitride.

The compressed hexagonal boron nitride content in the polycrystalline cubic boron nitride is preferably 0% by volume or more and 41.5% by volume or less, preferably 0% by volume or more and 1% by volume or less, and preferably 0% by volume. That is, it is preferable that the polycrystalline cubic boron nitride does not include compressed hexagonal boron nitride.

The wurtzite boron nitride content in the polycrystalline cubic boron nitride is preferably 0% by volume or more and 41.5% by volume or less, preferably 0% by volume or more and 1% by volume or less, and preferably 0% by volume. That is, it is preferable that the polycrystalline cubic boron nitride does not include wurtzite boron nitride.

Hexagonal boron nitride, compressed hexagonal boron nitride, and wurtzite boron nitride have low frictional resistance, and can reduce agglutination of the work material during cutting and reduce the cutting resistance. Further, hexagonal boron nitride, compressed hexagonal boron nitride, and wurtzite boron nitride are softer than cubic boron nitride and have excellent crack propagation resistance. Therefore, depending on the machining application, it may be preferable that the polycrystalline cubic boron nitride include hexagonal boron nitride, compressed hexagonal boron nitride and wurtzite boron nitride.

In the above case, it is preferable that the polycrystalline cubic boron nitride include 0.01% by volume or more of compressed hexagonal boron nitride. The polycrystalline cubic boron nitride preferably includes 0.01% by volume or more and 41.5% by volume or less of compressed hexagonal boron nitride, and preferably includes 0.01% by volume or more and 1% by volume or less of compressed hexagonal boron nitride. In this case, it is preferable that the polycrystalline cubic boron nitride include 99.99% by volume or less of cubic boron nitride.

In the above case, it is preferable that the polycrystalline cubic boron nitride include 0.1% by volume or more of wurtzite boron nitride. The polycrystalline cubic boron nitride preferably includes 0.1% by volume or more and 1.5% by volume or less of wurtzite boron nitride, and preferably includes 0.1% by volume or more and 1% by volume or less of wurtzite boron nitride. In this case, it is preferable that the polycrystalline cubic boron nitride include 99.9% by volume or less of cubic boron nitride.

The content (% by volume) of the cubic boron nitride, compressed hexagonal boron nitride, and wurtzite boron nitride in the polycrystalline cubic boron nitride can be measured by an X-ray diffraction method. The specific measurement method is as follows.

The polycrystalline cubic boron nitride is cut with a diamond grindstone-electrodeposited wire, and the cut surface is used as an observation surface.

Using an X-ray diffractometer ("MiniFlex 600" (trade name) manufactured by Rigaku), the X-ray spectrum of a cut surface of the polycrystalline cubic boron nitride is obtained. The conditions of the X-ray diffractometer at this time are as follows.

Characteristic X-ray: Cu-Kα (wavelength 1.54 Å)
Tube voltage: 45 kV
Tube current: 40 mA
Filter: Multi-layer mirror
Optical system: Focused method
X-ray diffraction method: θ-2θ method In the obtained X-ray spectrum, the following peak intensity A, peak intensity B, and peak intensity C are measured.

Peak intensity A: Peak intensity of compressed hexagonal boron nitride excluding the background from the peak intensity near the diffraction angle 2θ=28.5°.

Peak intensity B: Peak intensity of wurtzite boron nitride excluding the background from the peak intensity near the diffraction angle 2θ=40.8°.

Peak intensity C: Peak intensity of cubic boron nitride excluding the background from the peak intensity near the diffraction angle 2θ=43.5°.

The compressed hexagonal boron nitride content is obtained by calculating the value of peak intensity A/(peak intensity A+peak intensity B+peak intensity C). The wurtzite boron nitride content is obtained by calculating the value of peak intensity B/(peak intensity A+peak intensity B+peak intensity C). The cubic boron nitride content is obtained by calculating the value of peak intensity C/(peak intensity A+peak intensity B+peak intensity C). Since compressed hexagonal boron nitride, wurtzite boron nitride, and cubic boron nitride all have similar electron density, the above-described X-ray peak intensity ratio can be taken as the volume ratio in the polycrystalline cubic boron nitride.

<Dislocation Density>

In the polycrystalline cubic boron nitride of the present disclosure, the dislocation density of the cubic boron nitride is more than $8\times10^{15}/m^2$. Since the polycrystalline cubic boron nitride has a relatively large number of lattice defects in the polycrystalline body and a large strain, strength is improved. Therefore, a tool using the polycrystalline cubic boron nitride has can have a long tool life even in high load machining of an iron material or a material that is difficult to cut. The dislocation density is preferably $9\times10^{15}/m^2$ or more, and more preferably $1.0\times10^{16}/m^2$ or more. Although the upper limit of the dislocation density is not particularly limited, from a production viewpoint, it can be set to $1.4\times10^{16}/m^2$. That is, the dislocation density is preferably more than $8\times10^{15}/m^2$ and $1.4\times10^{16}/m^2$ or less, more preferably $9\times10^{15}/m^2$ or more and $1.4\times10^{16}/m^2$ or less, and further preferably $1.0\times10^{16}/m^2$ or more and $1.4\times10^{16}/m^2$ or less.

In the present specification, the dislocation density is calculated by the following procedure. A test piece composed of the polycrystalline cubic boron nitride is provided. In terms of size, the test piece has an observation surface of 2.0 mm×2.0 mm and a thickness of 1.0 mm. The observation surface of the test piece is polished.

X-ray diffraction measurement is performed on the observation surface of the test piece under the following conditions, and a line profile of a diffraction peak from each orientation plane of cubic boron nitride's major orientations which are (111), (200), (220), (311), (400) and (331) is obtained.

(X-Ray Diffraction Measurement Conditions)
X-ray source: synchrotron radiation
Condition for equipment: detector NaI (fluorescence is cut by an appropriate ROI)
Energy: 18 keV (wavelength: 0.6888 Å)
Spectroscopic crystal: Si (111)
Entrance slit: width 5 mm×height 0.5 mm
Light receiving slit: double slit (width 3 mm×height 0.5 mm)
Mirror: platinum coated mirror
Incident angle: 2.5 mrad
Scanning method: 2θ-θ scan
Measurement peaks: six peaks from cubic boron nitride's (111), (200), (220), (311), (400), and (331). When it is difficult to obtain a profile depending on texture and orientation, the peak for that Miller index is excluded.

Measurement conditions: there are 9 or more measurement points set in the full width at half maximum. Peak top intensity is set to 2000 counts or more. Peak tail is also used in the analysis, and accordingly, the measurement range is set to about 10 times the full width at half maximum.

A line profile obtained from the above X-ray diffraction measurement will be a profile including both a true broadening attributed to a physical quantity such as the sample's inhomogeneous strain and a broadening attributed to the equipment. In order to determine inhomogeneous strain and crystallite size, a component attributed to the equipment is removed from the measured line profile to obtain a true line profile. The true line profile is obtained by fitting the obtained line profile and the line profile that is attributed to the equipment by a pseudo Voigt function, and subtracting the line profile attributed to the equipment. $LaB_6$ was used as a standard sample for removing a broadening of a diffracted peak attributed to the equipment. When significantly collimated radiation is used, a broadening of a diffracted peak attributed to the equipment may be regarded as zero.

The obtained true line profile is analyzed using the modified Williamson-Hall method and the modified Warren-Averbach method to calculate dislocation density. The modified Williamson-Hall method and the modified Warren-Averbach method are known line profile analysis methods used for determining dislocation density.

The modified Williamson-Hall method's expression is represented by the following expression (I):

[Expression 1]

$$\Delta K = \frac{0.9}{D} + \left(\frac{\pi M^2 b^2}{2}\right)^{1/2} \rho^{1/2} K C^{1/2} + O(K^2 C) \quad (I)$$

where ΔK represents a half width of a line profile, D represents a crystallite size, M represents a dislocation arrangement parameter, b represents a Burgers vector, p represents dislocation density, K represents a scattering vector, $O(K^2C)$ represents a higher-order term of $K^2C$, and C represents an average contrast factor.

C in the above expression (I) is represented by the following expression (II):

$$C = C_{h00}[1-q(h^2k^2+h^2l^2+k^2l^2)/(h^2+k^2+l^2)^2] \quad (II)$$

In the above expression (II), a contrast factor $C_{h00}$ for screw dislocation and that for edge dislocation and a coefficient q for each contrast factor are obtained by using the computing code ANIZC, with a slip system of <110>{111}, and elastic stiffness $C_{11}$, $C_{12}$ and $C_{44}$ of 8.44 GPa, 1.9 GPa, and 4.83 GPa, respectively. Contrast factor $C_{h00}$ is 0.203 for screw dislocation and 0.212 for edge dislocation. The coefficient q for the contrast factor is 1.65 for screw dislocation and 0.58 for edge dislocation. Note that screw dislocation's ratio is fixed to 0.5 and edge dislocation's ratio is fixed to 0.5.

Furthermore, between dislocation and inhomogeneous strain, a relationship represented by an expression (III) is established using contrast factor C, as below:

$$<\varepsilon(L)^2> = (\rho C b^2/4\pi)\ln(R_e/L) \quad (III)$$

where $R_e$ represents dislocation's effective radius.

By the relationship of the above expression (III) and the Warren-Averbach expression, the following expression (IV) can be presented, and as the modified Warren-Averbach method, dislocation density p and a crystallite size can be determined.

$$\ln A(L) = \ln A^S(L) - (\pi L^2 \rho b^2/2)\ln(R_e/L)(K^2C) + O(K^2C)^2 \quad (IV)$$

where A(L) represents a Fourier series, $A^S(L)$ represents a Fourier series for a crystallite size, and L represents a Fourier length.

For details of the modified Williamson-Hall method and the modified Warren-Averbach method, see T. Ungar and A. Borbely, "The effect of dislocation contrast on x-ray line broadening: A new approach to line profile analysis," Appl. Phys. Lett., vol. 69, no. 21, p. 3173, 1996, and T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, no. 10, pp. 3693-3699, 1998.

<Crystal Grains>
(Median Diameter d50)

The polycrystalline cubic boron nitride of the present disclosure has a median diameter d50 of an equivalent circle diameter (hereinafter, also referred to as "median diameter d50") of a plurality of crystal grains included therein of 0.1 μm or more and 0.5 μm or less. Conventionally, it was thought that as the grain size of the crystal grains decreases, strength increases, and the cutting performance of the polycrystalline cubic boron nitride improves. Therefore, although the grain size of the crystal grains constituting the polycrystalline cubic boron nitride is smaller (for example, average grain size of less than 100 nm), but this tended to reduce the toughness.

On the other hand, since the polycrystalline cubic boron nitride of the present disclosure secures strength by increasing the dislocation density of the cubic boron nitride as described above in (ii), the grain size can be larger than previously. Therefore, the polycrystalline cubic boron nitride of the present disclosure can have improved toughness and excellent crack propagation resistance. Therefore, a tool using the polycrystalline cubic boron nitride can have a long tool life even in high load machining of an iron material or a material that is difficult to cut.

(Area Ratio of Plate-Like Particles Having Aspect Ratio of 4 or More)

It is preferable that, when a cross-section of the polycrystalline cubic boron nitride is observed at a magnification of 10000× using a scanning electron microscope, an area ratio of the plate-like particles having an aspect ratio of 4 or more is 30% or less in terms of surface area. In a conventional polycrystalline cubic boron nitride, the decrease in toughness accompanying the reduction in grain size was compensated for by the presence of plate-like structures in the cubic polycrystalline body. However, particularly during high-efficiency machining of materials that are difficult to cut, these plate-like particles suddenly fall off from the blade edge, causing the blade edge to become damaged, and have hence been a factor in uneven and decreased tool life.

In the polycrystalline cubic boron nitride according to the present embodiment, the content of plate-like particles having an aspect ratio of 4 or more is reduced. Therefore, the polycrystalline cubic boron nitride is less likely to be undergo sudden damage to its blade edge due to the plate-like particles, and can have a long tool life even in high load machining of an iron material or a material that is difficult to cut.

The area ratio of the plate-like particles having an aspect ratio of 4 or more is preferably 30% or less in terms of surface area. The area ratio of the plate-like particles having an aspect ratio of 4 or more is preferably 0% or more and 30% or less in terms of surface area, and more preferably 0% or more and 5% or less in terms of surface area.

(Method for Measuring Median Diameter d50 and Area Ratio of Plate-Like Particles Having an Aspect Ratio of 4 or More)

In the present specification, the median diameter d50 of an equivalent circle diameter of the plurality of crystal grains included in the polycrystalline cubic boron nitride refers to a value obtained by measuring each median diameter d50 of the plurality of crystal grains at each of five arbitrarily selected measurement locations, and calculating the average value thereof.

In the present specification, the area ratio of the plate-like particles having an aspect ratio of 4 or more in the polycrystalline cubic boron nitride means the value obtained by measuring the area ratio of plate-like particles having an aspect ratio of 4 or more at each of five arbitrarily selected locations, and calculating the average value thereof.

To the extent measured by the applicant, it was confirmed that as long as the median diameter d50 and the area ratio of the plate-like particles having an aspect ratio of 4 or more are measured in the same sample, even the calculation is performed a plurality of times by changing the selected locations for the measurement visual field in the polycrystalline cubic boron nitride, there was almost no variation in the measurement results and there was no arbitrariness even when the measurement visual field was randomly set.

When the cubic boron nitride crystalline body is used as a part of a tool, a portion of the polycrystalline cubic boron nitride is cut with a diamond grindstone-electrodeposited wire or the like, the cut cross-section is polished, and five measurement locations are arbitrarily set on the polished surface.

The method for measuring at each measurement location the median diameter d50 of an equivalent circle diameter of the plurality of crystal grains and the area ratio of the plate-like particles having an aspect ratio of 4 or more will now be specifically described.

The polycrystalline cubic boron nitride is cut with a diamond grindstone-electrodeposited wire or the like so that the measurement locations are exposed, and the cut surface is polished. The measurement locations on the polished surface are observed using a SEM ("JSM-7500F" (trade name) manufactured by JEOL Ltd.) to obtain SEM images. The size of the measurement visual field is 12 µm×15 µm, and the observation magnification is 10,000 times.

Figure 6:
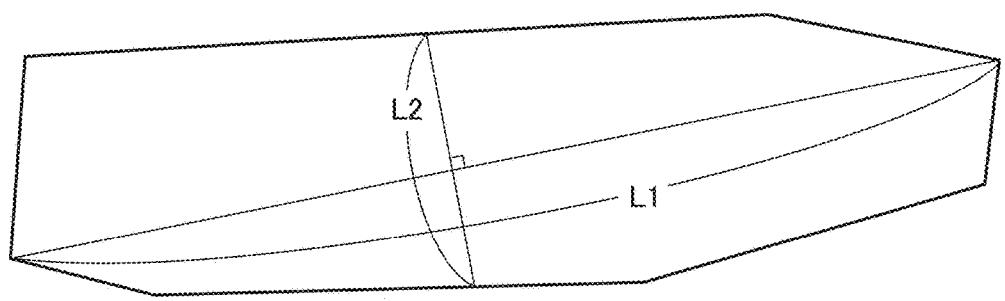
FIG. 6 is a diagram for showing an aspect ratio of crystal grains.

For each of the 5 SEM images, in a state in which the grain boundaries of the crystal grains observed in the measurement visual field were isolated, the aspect ratio of each crystal grain and the equivalent circle diameter of each crystal grain were calculated using image processing software (Win Roof ver. 7.4.5). Here, the aspect ratio means a value (major axis/minor axis) of the ratio between the major axis and the minor axis of the crystal grains on the cut surface. When the shape of the crystal grain is an irregular shape as shown in FIG. 6, the aspect ratio is calculated using image processing software according to the following procedures (a) to (c).

(a) The longest line segment that can be drawn inside the crystal grain (both ends are in contact with the crystal grain boundary) (hereinafter, also referred to as "first line segment") is identified, and a length L1 of the first line segment is measured.

(b) The longest line segment that is orthogonal to the above first line segment and that can be drawn inside the crystal grain (both ends are in contact with the crystal grain boundary) (hereinafter referred to as "second line segment") is identified, and a length L2 of the second line segment is measured.

(c) A value (L1/L2) of the ratio between the length L1 of the first line segment and the length L2 of the second line segment is calculated. The value of (L1/L2) is taken as the aspect ratio.

The median diameter d50 is calculated from the distribution of the equivalent circle diameters of all the crystal grains in the measurement visual field. The area ratio of plate-like particles having an aspect ratio of 4 or more is calculated with the entire area of the measurement visual field as the denominator.

<Applications>

The polycrystalline cubic boron nitride of the present disclosure is suitable for use in a cutting tool, a wear resistant tool, a grinding tool, and the like.

A cutting tool, a wear resistant tool, and a grinding tool using the polycrystalline cubic boron nitride of the present disclosure may each be entirely composed of the polycrystalline cubic boron nitride, or only a part thereof (for example, in the case of a cutting tool, the blade edge portion) may be composed of the polycrystalline cubic boron nitride. Further, a coating film may be formed on the surface of each tool.

Examples of the cutting tool include a drill, an end mill, a blade edge exchangeable cutting tip for a drill, a blade edge exchangeable cutting tip for an end mill, a blade edge exchangeable cutting tip for milling, a blade edge exchangeable cutting tip for turning, a metal saw, a gear cutting tool, a reamer, a tap, a cutting bite, and the like.

Examples of the wear resistant tool include a die, a scriber, a scribing wheel, a dresser, and the like. Examples of the grinding tool include a grinding wheel.

Second Embodiment: Method for Manufacturing Polycrystalline Cubic Boron Nitride

Figure 2:
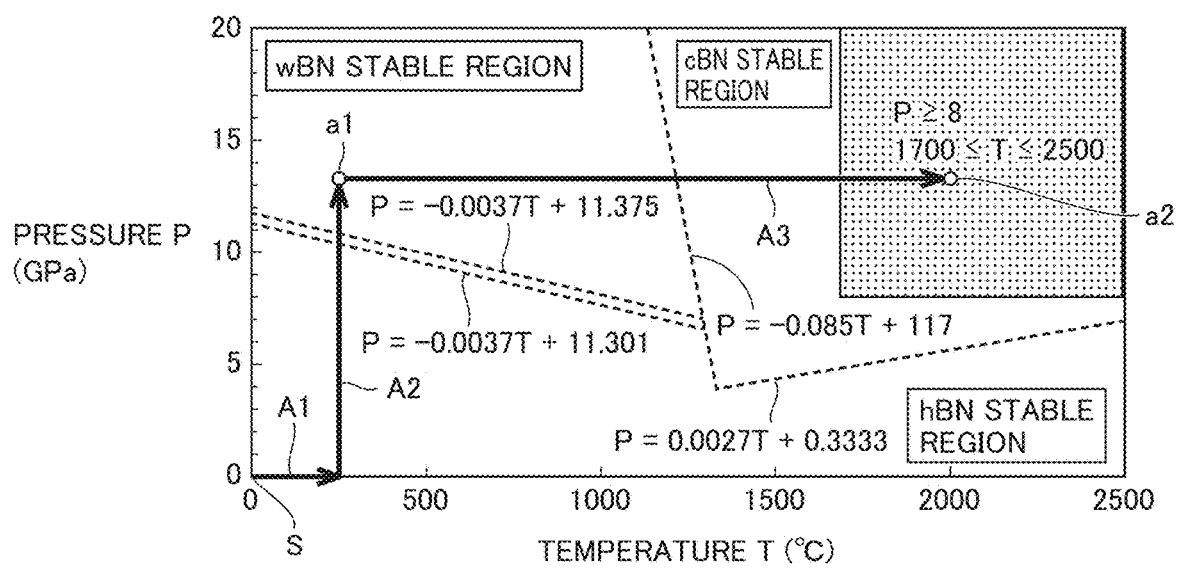
FIG. 2 is a diagram for showing an example of a method for manufacturing the polycrystalline cubic boron nitride according to the present disclosure.
Figure 3:
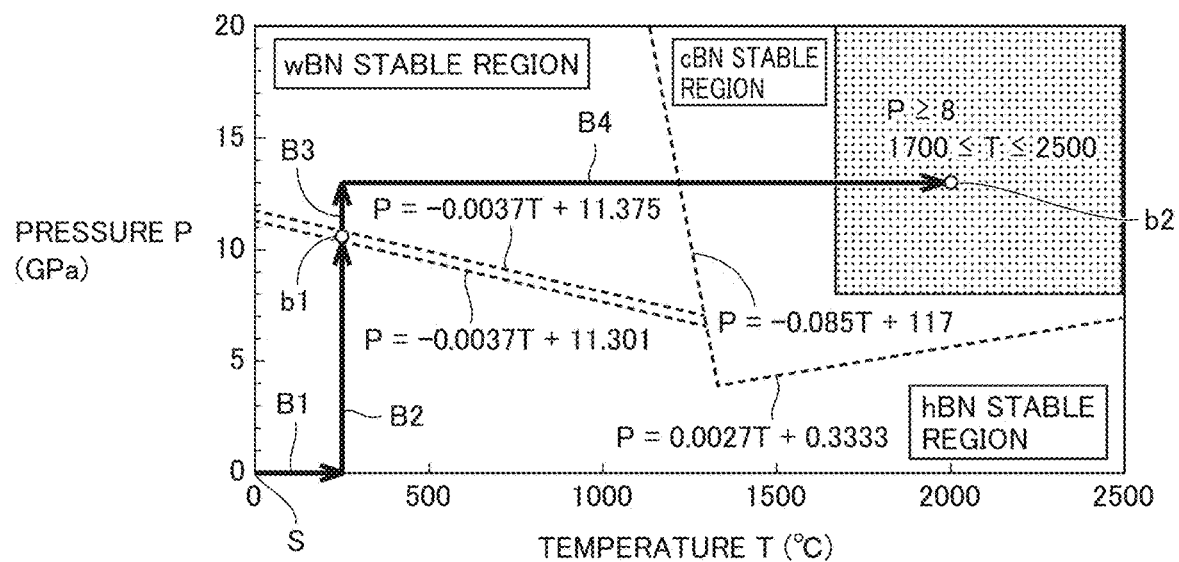
FIG. 3 is a diagram for showing another example of a method for manufacturing the polycrystalline cubic boron nitride according to the present disclosure.
Figure 4:
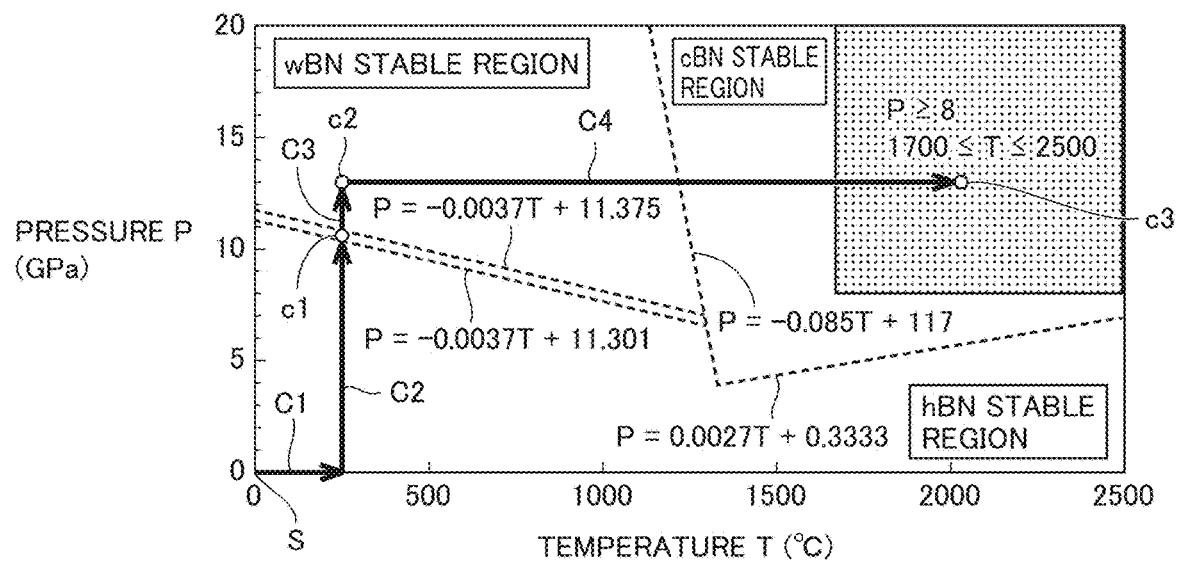
FIG. 4 is a diagram for showing another example of a method for manufacturing the polycrystalline cubic boron nitride of the present disclosure.
Figure 5:
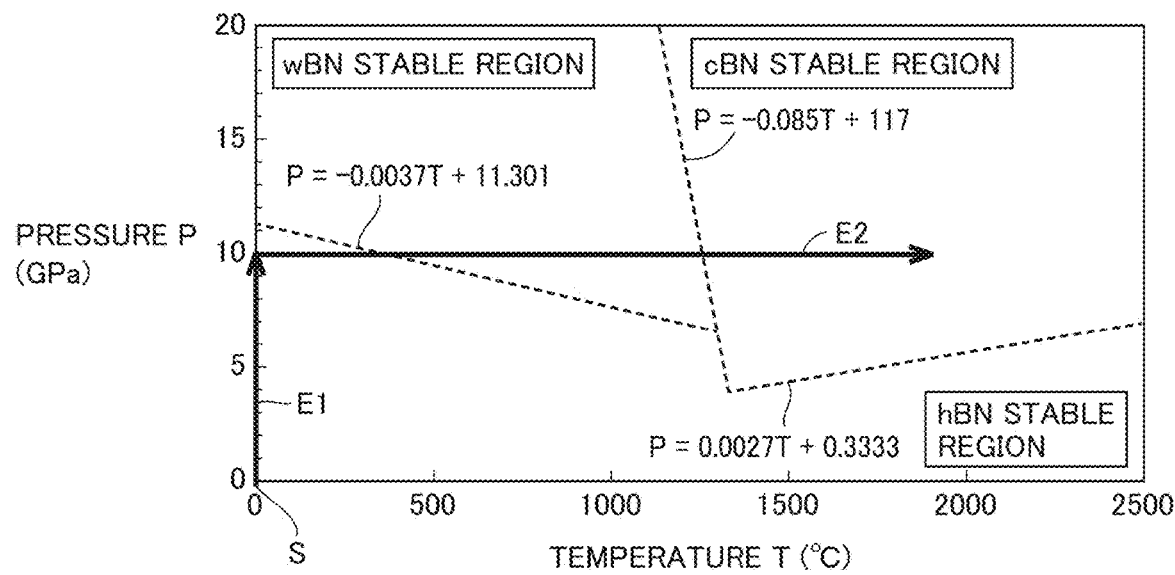
FIG. 5 is a diagram for showing a conventional example of a method for manufacturing a polycrystalline cubic boron nitride.

A method for manufacturing the polycrystalline cubic boron nitride of the present disclosure will now be described with reference to FIGS. 1 to 5. FIG. 1 is a pressure-temperature phase diagram of boron nitride. FIGS. 2 to 4 are diagrams for showing methods for manufacturing the polycrystalline cubic boron nitride of the present disclosure. FIG. 5 is a diagram for showing a conventional example of a method for manufacturing a polycrystalline cubic boron nitride.

A method for manufacturing the polycrystalline cubic boron nitride of the present disclosure is a method for manufacturing the polycrystalline cubic boron nitride of the first embodiment. The method for manufacturing the polycrystalline cubic boron nitride of the present disclosure comprises a first step of preparing a hexagonal boron nitride powder (hereinafter, also referred to as "first step"), a second step of heating and pressurizing the hexagonal boron nitride powder to a temperature greater than or equal to 1700° C. and less than or equal to 2500° C. and to a pressure greater than or equal to 8 GPa, with the temperature and the pressure passing through a temperature and a pressure in a stable region of a wurtzite boron nitride, to obtain a boron nitride polycrystalline body (hereinafter, also referred to as "second step"), and a third step of holding the boron nitride polycrystalline body obtained in the second step for 3 minutes or more and 60 minutes or less under conditions of a temperature of 1700° C. or more and 2500° C. or less and a pressure of 8 GPa or more to obtain the polycrystalline cubic boron nitride (hereinafter, also referred to as "third step"). In this method, the stable region of wurtzite boron nitride is, when the temperature is represented as T (° C.) and the pressure as P (GPa), a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

in a heating and pressurizing path of the second step, an entry temperature into the stable region of wurtzite boron nitride is 500° C. or less, and the second step comprises a step of holding the temperature and the pressure in the heating and pressurizing path for 10 minutes or more at a temperature and a pressure in the stable region of wurtzite boron nitride.

Before giving a detailed description of the method for manufacturing the polycrystalline cubic boron nitride of the present disclosure, in order to help understanding thereof, a conventional example of a method for manufacturing a polycrystalline cubic boron nitride will be described.

As shown in FIG. 1, boron nitride includes three phases, namely, hexagonal boron nitride, which is a stable phase at ordinary temperature and ordinary pressure, cubic boron nitride, which is a stable phase at high temperature and high pressure, and wurtzite boron nitride, which is a metastable phase during the transition from hexagonal boron nitride to cubic boron nitride.

The boundary of each phase can be represented by a linear function. In the present specification, the temperature and pressure in the stable region of each phase can be shown using a linear function.

In the present specification, the temperature and pressure in the stable region of wurtzite boron nitride (in FIG. 1, indicated as "wBN stable region") are defined as, when the temperature is represented as T (° C.) and the pressure as P (GPa), a temperature and a pressure that simultaneously satisfy the following Formula 1 and
Formula 2.

$$P \geq -0.0037T + 11.301 \quad \text{Formula 1:}$$

$$P \leq -0.085T + 117 \quad \text{Formula 2:}$$

In the present specification, the temperature and pressure in the stable region of hexagonal boron nitride (in FIG. 1, indicated as "hBN stable region") are defined as, when the temperature is represented as T° C. and the pressure as P (GPa), a temperature and a pressure that simultaneously satisfy the following Formula A and Formula B or a temperature and a pressure that simultaneously satisfy the following Formula C and Formula D.

$$P \leq -0.0037T + 11.301 \quad \text{Formula A:}$$

$$P \leq -0.085T + 117 \quad \text{Formula B:}$$

$$P \leq -0.0027T + 0.3333 \quad \text{Formula C:}$$

$$P \geq -0.085T + 117 \quad \text{Formula D:}$$

In the present specification, the temperature and pressure in the stable region of cubic boron nitride (in FIG. 1, indicated as "cBN stable region") are defined as, when the temperature is represented as T (° C.) and the pressure as P (GPa), a temperature and a pressure that simultaneously satisfy the following Formula D and Formula E.

$$P \geq -0.085T + 117 \quad \text{Formula D:}$$

$$P \geq -0.0027T + 0.3333 \quad \text{Formula E:}$$

Conventionally, the path shown in FIG. 5 (hereinafter, also referred to as "path of FIG. 5") was studied as the heating and pressurizing path for hexagonal boron nitride to attain a temperature and a pressure within the stable region of cubic boron nitride.

In the path of FIG. 5, when heating and pressurizing from the temperature and pressure at the starting point S (ordinary temperature and ordinary pressure) to the temperature and pressure in the stable region of cubic boron nitride (hereinafter, also referred to as "target temperature" and "target pressure", respectively), first, the pressure is increased to the target pressure (in FIG. 5, about 8 GPa) (arrow E1 in FIG. 5), and then the temperature is raised to the target temperature (in FIG. 5, about 1900° C.) (arrow E2 in FIG. 5). In the path of FIG. 5, heating and pressurization are each performed once, and therefore control of the heating and pressurizing operation is simple, and has been conventionally adopted.

In the path of FIG. 5, on the way to attaining a temperature and a pressure in the stable region of cubic boron nitride from the starting point S, the temperature and pressure pass through the stable region of wurtzite boron nitride. Conventionally, in order to shorten the cycle time of the production process, it was considered that a shorter time for attaining the stable region of cubic boron nitride from the starting point S is better. Further, the knowledge that in the heating and pressurizing path of the second step, the quality of the obtained polycrystalline cubic boron nitride improves by holding it at a temperature and a pressure in the stable region of wurtzite boron nitride for a certain period of time did not exist. Therefore, the heating and pressurizing conditions have been set so that the period of time taken passing through the stable region of wurtzite boron nitride is shorter.

However, for the polycrystalline cubic boron nitride obtained in the path of FIG. 5, damage tends to occur during machining, and the tool life tends to be shorter. Based on analytical evaluation of the polycrystalline cubic boron nitride obtained in the path of FIG. 5 carried out in order to discover the reasons for this, the present inventors surmised that the cubic boron nitride content in the polycrystalline cubic boron nitride has an influence on the tool life. Here, the cubic boron nitride content in the polycrystalline cubic boron nitride means, in the case that the polycrystalline cubic boron nitride includes cubic boron nitride together with hexagonal boron nitride and/or wurtzite boron nitride, the content of cubic boron nitride with the total content of cubic boron nitride, hexagonal boron nitride, and wurtzite boron nitride as the denominator.

Specifically, in the path of FIG. 5, it is surmised that since the holding time in the stable region of wurtzite boron nitride is short, the conversion rate from hexagonal boron nitride to wurtzite boron nitride decreases, and as a result, the conversion rate to cubic boron nitride also tends to decrease. Therefore, it was surmised that in the obtained polycrystalline cubic boron nitride, the cubic boron nitride content decreases, damage easily occurs during machining, and tool life tends to be shorter.

As a result of further studies by the present inventors, in the production steps of a polycrystalline cubic boron nitride, it was surmised that the entry temperature into the stable region of wurtzite boron nitride is related to the dislocation density of cubic boron nitride, and as a result, that the strength of the obtained polycrystalline cubic boron nitride is affected.

The present inventors intensively studied the pressure and temperature paths in the production steps of a polycrystalline cubic boron nitride while considering the above-described situation and the influence on toughness of the grain size of the plurality of crystal grains included in the polycrystalline cubic boron nitride. As a result, the present inventors discovered heating and pressurizing conditions that are capable of obtaining a polycrystalline cubic boron nitride that can have a long tool life even in machining of an iron material or a material that is difficult to cut.

In the conventional method for manufacturing a cBN sintered body, a cBN powder is used as a starting material, the cBN powder is pressurized and then heated to perform sintering. It is inferred that the pressurization causes the grains of the cBN powder, which have a high hardness, to come into contact with each other, whereby dislocations are introduced into the cBN particles. However, as in the method for manufacturing of the polycrystalline cubic boron nitride of the present disclosure, when a low hardness hBN powder is used as the starting material, and the heating and pressurizing treatment are carried out on such an hBN powder and converted into a polycrystalline cubic boron nitride, it is impossible to predict the dislocation density of the polycrystalline cubic boron nitride. As a result of intensive studies, the present inventors have newly discovered a relationship between the heating and pressurizing conditions and the dislocation density and tool performance of the polycrystalline cubic boron nitride.

Details of each step of the method for manufacturing the polycrystalline cubic boron nitride of the present disclosure will now be described below with reference to FIGS. 2 to 4. In FIGS. 2 to 4, the arrows indicate the heating and pressurizing path. Further, a circle at the tip of an arrow indicates that the temperature and pressure are held for a certain period of time. Further, the path shown in FIGS. 2 to 4 is an example, and the present invention is not limited to this.

<First Step>

A hexagonal boron nitride powder is prepared as the raw material for the polycrystalline cubic boron nitride. The hexagonal boron nitride powder has a purity (hexagonal boron nitride content) of preferably 98.5% or more, more preferably 99% or more, and most preferably 100%. The grain size of the hexagonal boron nitride powder is not particularly limited, but can be, for example, 0.1 μm or more and 10 μm or less.

<Second Step>

Next, the hexagonal boron nitride powder is heated and pressured to a temperature greater than or equal to 1700° C. and less than or equal to 2500° C. (hereinafter also referred to as "attainment temperature") and to a pressure greater than or equal to 8 GPa (hereinafter also referred to as "attainment pressure"), with the temperature and the pressure passing through a temperature and a pressure in a stable region of a wurtzite boron nitride, to obtain a boron nitride polycrystalline body (arrows A1, A2, and A3 in FIG. 2, arrows B1, B2, B3, and B4 in FIG. 3, and arrows C1, C2, C3, and C4 in FIG. 4). In the heating and pressurizing path of the second step, the entry temperature into the stable region of wurtzite boron nitride is 500° C. or less. Further, the second step includes a step of holding the temperature and the pressure in the heating and pressurizing path for 10 minutes or more at a temperature and a pressure in the stable region of wurtzite boron nitride (a1 in FIG. 2, b1 in FIG. 3, and c1 and c2 in FIG. 4).

The sintered body obtained in the second step has a lower cubic boron nitride content than the polycrystalline cubic boron nitride obtained after the third step. Therefore, in order to distinguish between the sintered body obtained in the second step and the polycrystalline cubic boron nitride obtained after the third step, in the present specification, the sintered body obtained in the second step is referred to as a "boron nitride sintered body".

In the present specification, the expression "entry temperature into the stable region of wurtzite boron nitride" means the temperature at which the boron nitride first attains the stable region of wurtzite boron nitride in the heating and pressurizing path of the second step. This entry temperature is, in FIG. 2, the temperature (about 250° C.) at the intersection of the arrow A2 and the line P=−0.0037T+11.301, in FIG. 3, the temperature (about 250° C.) at the intersection of the arrow B2 and the line P=−0.0037T+11.301, and in FIG. 4, the temperature (about 250° C.) at the intersection of the arrow C2 and the line P=−0.0037T+11.301.

In the heating and pressurizing path of the second step, the entry temperature into the stable region of wurtzite boron nitride is 500° C. or less. According to this, the hexagonal boron nitride powder is converted into wurtzite boron nitride in an environment where atomic diffusion does not easily occur, and is then converted into cubic boron nitride. Therefore, the polycrystalline cubic boron nitride that is finally obtained has a relatively large number of lattice defects in the polycrystalline body, and the cubic boron nitride has a large dislocation density and a large strain, so that strength is improved. Accordingly, a tool using the polycrystalline cubic boron nitride can have a long tool life even in high load machining of an iron material or a material that is difficult to cut.

The entry temperature into the stable region of wurtzite boron nitride is preferably 300° C. or less, and more preferably 100° C. or less. The lower the entry temperature, the less easily atomic diffusion occurs, and lattice defects tend to increase. The lower limit of the entry temperature may be, for example, 10° C. The entry temperature into the stable region of wurtzite boron nitride is preferably 10° C. or more and 500° C. or less, more preferably 10° C. or more and 300° C. or less, and further preferably 10° C. or more and 100° C. or less.

The second step includes a step of holding the temperature and pressure in the heating and pressurizing path for 10 minutes or more at a temperature and a pressure in the stable region of wurtzite boron nitride. According to this, the hexagonal boron nitride powder or a powder including hBN powder and powder in which a part thereof has undergone phase conversion is held for 10 minutes or more under conditions of a temperature and a pressure in the stable region of wurtzite boron nitride. Due to the long holding time in the stable region of wurtzite boron nitride, the conversion rate from hexagonal boron nitride to wurtzite boron nitride is improved, and as a result, the conversion rate to cubic boron nitride is also improved. Accordingly, the polycrystalline cubic boron nitride that is finally obtained has an increased cubic boron nitride content, and is less likely to be damaged during machining. Therefore, a tool using the polycrystalline cubic boron nitride can have a long tool life even in high load machining of an iron material or a material that is difficult to cut.

The holding time at a temperature and a pressure in the stable region of wurtzite boron nitride is preferably 15 minutes or more, and more preferably 30 minutes or more. From a production viewpoint, the upper limit of the holding time is preferably 60 minutes. The holding time is preferably 10 minutes or more and 60 minutes or less, more preferably 15 minutes or more and 60 minutes or less, and further preferably 30 minutes or more and 60 minutes or less.

The second step preferably includes a step of, when the temperature is represented as T (° C.) and the pressure as P (GPa), holding the temperature and the pressure in the heating and pressurizing path for 10 minutes or more at a temperature and a pressure in a region that simultaneously satisfies the following Formula 1, Formula 2, and Formula 3.

$$P \geq -0.0037T + 11.301 \quad \text{Formula 1:}$$

$$P \leq -0.085T + 117 \quad \text{Formula 2:}$$

$$P \leq -0.0037T + 11.375 \quad \text{Formula 3:}$$

The region that simultaneously satisfies Formula 1, Formula 2, and Formula 3 is a region that is in the stable region of wurtzite boron nitride and that is near the boundary between the stable region of hexagonal boron nitride and the stable region of wurtzite boron nitride. According to this, the hexagonal boron nitride powder or a powder including hBN powder and powder in which a part thereof has undergone phase conversion is held for 10 minutes or more under conditions of a temperature and a pressure that simultaneously satisfy Formula 1, Formula 2, and Formula 3. By holding in this region for 10 minutes or more, lattice defects are even more likely to occur. As a result, it is thought that the polycrystalline cubic boron nitride that is finally obtained has many lattice defects and a large strain in the polycrystalline body, so strength is further improved. Therefore, a tool using the polycrystalline cubic boron nitride can have a longer tool life even in high load machining of an iron material or a material that is difficult to cut.

The holding time at a temperature and a pressure in the region that simultaneously satisfies Formula 1, Formula 2, and Formula 3 is more preferably 15 minutes or more, and further preferably 20 minutes or more. From a production viewpoint, the upper limit of the holding time is preferably 60 minutes. The holding time is preferably 10 minutes or more and 60 minutes or less, more preferably 15 minutes or more and 60 minutes or less, and further preferably 20 minutes or more and 60 minutes or less.

When the second step includes the step of holding for 10 minutes or more at a temperature and a pressure in the region that simultaneously satisfies Formula 1, Formula 2, and Formula 3, the second step can include a step of then further holding the temperature and the pressure in the heating and pressurizing path for 1 minute or more at a temperature and a pressure in a region that satisfies the following Formula 2 and Formula 4 (hereinafter, also referred to as "second step B").

$$P \leq -0.085T + 117 \quad \text{Formula 2:}$$

$$P > -0.0037T + 11.375 \quad \text{Formula 4:}$$

According to this, the conversion rate from hexagonal boron nitride to wurtzite boron nitride is even more improved, and as a result, the conversion rate to cubic boron nitride is also improved. As a result, the polycrystalline cubic boron nitride that is finally obtained has an increased cubic boron nitride content, and is less likely to be damaged during machining. Therefore, a tool using the polycrystalline cubic boron nitride can have a long tool life even in high load machining of an iron material or a material that is difficult to cut.

The holding time at a temperature and a pressure in the region that satisfies Formula 2 and Formula 4 is more preferably 10 minutes or more, and further preferably 15 minutes or more. From a production viewpoint, the upper limit of the holding time is preferably 60 minutes. The holding time is preferably 1 minute or more and 60 minutes or less, more preferably 10 minutes or more and 60 minutes or less, and further preferably 15 minutes or more and 60 minutes or less.

In the second step, only the second step A may be performed, or the second step B may be performed after the second step A. Further, the second step may be a step of holding for 10 minutes or more in a region that satisfies Formula 2 and Formula 4.

The attainment pressure in the second step is 8 GPa or more, preferably 10 GPa or more, and more preferably 13 GPa or more. The upper limit of the attainment pressure is not particularly limited, but may be 15 GPa, for example. The attainment pressure in the second step is preferably 8 GPa or more and 15 GPa or less, more preferably 10 GPa or more and 15 GPa or less, and further preferably 13 GPa or more and 15 GPa or less.

In the second step, in the paths of FIGS. 2 to 4, heating is carried out, then pressurizing is carried out, and then heating is further carried out, but the heating and pressurizing path is not limited to this. The heating and pressurizing path can be any path in which the entry temperature into the stable region of wurtzite boron nitride can be 500° C. or less, holding is possible for 10 minutes or more at a temperature and a pressure in the stable region of wurtzite boron nitride, the attainment temperature can be 1700° C. or more and 2500° C. or less, and the attainment pressure can be 8 GPa or more. For example, heating and pressurization may be performed simultaneously.

As described above, the boron nitride polycrystalline body can be obtained by performing the second step on a hexagonal boron nitride powder.

<Third Step>

After the second step, a step of holding the boron nitride polycrystalline body obtained in the second step for 3 minutes or more and 60 minutes or less under conditions of a temperature of 1700° C. or more and 2500° C. or less (hereinafter, also referred to as "final sintering temperature") and a pressure of 8 GPa or more (hereinafter, also referred to as "final sintering pressure") is performed. As a result of this step, the obtained polycrystalline cubic boron nitride has an increased cubic boron nitride content and can achieve an even longer tool life.

The final sintering temperature is preferably 1900° C. or more and 2400° C. or less. The final sintering pressure is preferably 8 GPa or more and 15 GPa or less, and more preferably 10 GPa or more and 15 GPa or less. The holding time in the third step is preferably 10 minutes or more and 20 minutes or less.

<Characteristics of Polycrystalline Cubic Boron Nitride Obtained by Paths Shown in FIGS. 2 to 4>

[Path of FIG. 2]

In the path of FIG. 2, first, the temperature is increased from the starting point S to a predetermined temperature of 500° C. or less (in FIG. 2, about 250° C.) (arrow A1), then, while maintaining the temperature, the pressure is increased to a pressure in the stable region of wurtzite boron nitride (in FIG. 2, about 13 GPa) (arrow A2), and that temperature (about 250° C.) and pressure (about 13 GPa) are held for 10 minutes or more (a1 in FIG. 2). Then, while maintaining the pressure (about 13 GPa), the temperature is increased to 1700° C. or more and 2500° C. or less (in FIG. 2, about 2000° C.) (arrow A3), and that temperature (about 2000° C.) and pressure (about 13 GPa) are held for 3 minutes or more and 60 minutes or less (a2 in FIG. 2). In FIG. 2, the second step is indicated by arrows A1, A2, and A3 as well as by a1, and the third step is indicated by a2.

In the path of FIG. 2, the entry temperature into the stable region of wurtzite boron nitride is 500° C. or less (about 250° C.). According to this, the hexagonal boron nitride powder is converted into wurtzite boron nitride in an environment where atomic diffusion does not easily occur, and is then converted into cubic boron nitride. Therefore, the obtained polycrystalline cubic boron nitride has a relatively large number of lattice defects in the polycrystalline body, and the cubic boron nitride has a large dislocation density and a large strain, so that strength is improved. Therefore, a tool using the polycrystalline cubic boron nitride can have a long tool life even in high load machining of an iron material or a material that is difficult to cut.

In the path of FIG. 2, the temperature and pressure in the heating and pressurizing path are held for 10 minutes or more at a temperature and a pressure in the stable region of wurtzite boron nitride. According to this, since the holding time in the stable region of wurtzite boron nitride is long, the conversion rate from hexagonal boron nitride to wurtzite boron nitride is improved, and as a result, the conversion rate to cubic boron nitride is also improved. Therefore, the obtained polycrystalline cubic boron nitride has an increased cubic boron nitride content and is less likely to be damaged during machining. Therefore, a tool using the polycrystalline cubic boron nitride can have a long tool life even in high load machining of an iron material or a material that is difficult to cut.

In the path of FIG. 2, the boron nitride polycrystalline body obtained in the second step is held for 3 minutes or more and 60 minutes or less under conditions of a temperature of 1700° C. or more and 2500° C. or less and a pressure of 8 GPa or more. According to this, the obtained polycrystalline cubic boron nitride has an increased cubic boron nitride content and can have a longer tool life.

[Path of FIG. 3]

In the path of FIG. 3, first, the temperature is increased from the starting point S to a predetermined temperature of 500° C. or less (in FIG. 3, about 250° C.) (arrow B1), then, while maintaining the temperature, the pressure is increased to a pressure in a region that simultaneously satisfies the following Formula 1, Formula 2, and Formula 3 (in FIG. 3, about 10.4 GPa) (arrow B2), and that temperature (about 250° C.) and pressure (about 10.4 GPa) are held for 10 minutes or more (b1 in FIG. 3).

$$P \geq -0.0037T + 11.301 \qquad \text{Formula 1:}$$

$$P \leq -0.085T + 117 \qquad \text{Formula 2:}$$

$$P \leq -0.0037T + 11.375 \qquad \text{Formula 3:}$$

Next, while maintaining the temperature (about 250° C.), the pressure is increased in the stable region of wurtzite boron nitride (in FIG. 3, about 13 GPa) (arrow B3). Then, while maintaining the pressure (about 13 GPa), the temperature is increased to 1700° C. or more and 2500° C. or less (in FIG. 3, about 2000° C.) (arrow B4), and that temperature (about 2000° C.) and pressure (about 13 GPa) are held for 3 minutes or more and 60 minutes or less (b2 in FIG. 3). In FIG. 3, the second step is indicated by arrows B1, B2, B3, and B4 as well as by b1, and the third step is indicated by b2.

In the path of FIG. 3, the entry temperature into the stable region of wurtzite boron nitride is 500° C. or less (about 250° C.). According to this, the hexagonal boron nitride powder is converted into wurtzite boron nitride in an environment where atomic diffusion does not easily occur, and is then converted into cubic boron nitride. Therefore, the obtained polycrystalline cubic boron nitride has a relatively large number of lattice defects in the polycrystalline body, and the cubic boron nitride has a large dislocation density and a large strain, so that strength is improved. Therefore, a tool using the polycrystalline cubic boron nitride can have a long tool life even in high load machining of an iron material or a material that is difficult to cut.

In the path of FIG. 3, a step of holding for 10 minutes or more at a temperature and a pressure in a region that simultaneously satisfies Formula 1, Formula 2, and Formula 3 is included. That is, compared with the path of FIG. 2, in the path of FIG. 3, the temperature and the pressure in the heating and pressurizing path are held for 10 minutes or more at a temperature and a pressure that is in the stable region of wurtzite boron nitride and that is closer to the stable region of hexagonal boron nitride (that is, a temperature and a pressure near the boundary between the stable region of wurtzite boron nitride and the stable region of hexagonal boron nitride). As a result, compared with the path of FIG. 2, lattice defects occur even more easily, and it is thought that since the polycrystalline cubic boron nitride obtained in the path of FIG. 3 has more lattice defects in the polycrystalline body and a larger strain than the polycrystalline cubic boron nitride obtained in the path of FIG. 2, strength is further improved. Therefore, a tool using the polycrystalline cubic boron nitride obtained in the path of FIG. 3 can have a longer tool life even in high load machining of an iron material or a material that is difficult to cut.

In the path of FIG. 3, the boron nitride polycrystalline body obtained in the second step is held for 3 minutes or more and 60 minutes or less under conditions of a temperature of 1700° C. or more and 2500° C. or less and a pressure of 8 GPa or more. According to this, the obtained polycrystalline cubic boron nitride has an increased cubic boron nitride content and can have a longer tool life.

[Path of FIG. 4]

In the path of FIG. 4, first, the temperature is increased from the starting point S to a predetermined temperature of 500° C. or less (in FIG. 4, about 250° C.) (arrow C1), then, while maintaining the temperature, the pressure is increased to a pressure in a region that simultaneously satisfies the following Formula 1, Formula 2, and Formula 3 (in FIG. 4, about 10.4 GPa) (arrow C2), and that temperature (about 250° C.) and pressure (about 10.4 GPa) are held for 10 minutes or more (c1 in FIG. 4).

$$P \geq -0.0037T + 11.301 \qquad \text{Formula 1:}$$

$$P \leq -0.085T + 117 \qquad \text{Formula 2:}$$

$$P \leq -0.0037T + 11.375 \qquad \text{Formula 3:}$$

Next, while maintaining the temperature (about 250° C.), the pressure is increased in the stable region of wurtzite boron nitride (in FIG. 4, about 13 GPa) (arrow C3), and then that temperature (about 250° C.) and pressure (about 13 GPa) are held for 1 minute or more (temperature and pressure indicated by c2 in FIG. 4). That is, in the path of FIG. 4, after a step of holding for 10 minutes or more at a temperature and a pressure that simultaneously satisfies Formula 1, Formula 2 and Formula 3, a step of further holding for 1 minute or more at a temperature and a pressure in a region that satisfies the following Formula 2 and Formula 4 is included.

$$P \leq -0.085T + 117 \qquad \text{Formula 2:}$$

$$P > -0.0037T + 11.375 \qquad \text{Formula 4:}$$

Then, while maintaining the pressure (about 13 GPa), the temperature is increased to 1700° C. or more and 2500° C. or less (in FIG. 4, about 2000° C.) (arrow C4), and that temperature (about 2000° C.) and pressure (about 13 GPa) are held for 3 minutes or more and 60 minutes or less (c3 in FIG. 4). In FIG. 4, the second step is indicated by arrows C1, C2, C3, and C4 as well as by c1 and c2, and the third step is indicated by c3.

In the path of FIG. 4, the entry temperature into the stable region of wurtzite boron nitride is 500° C. or less (about 250° C.). According to this, the hexagonal boron nitride powder is converted into wurtzite boron nitride in an environment where atomic diffusion does not easily occur, and is then converted into cubic boron nitride. Therefore, the obtained polycrystalline cubic boron nitride has a relatively large number of lattice defects in the polycrystalline body, and the cubic boron nitride has a large dislocation density and a large strain, so that strength is improved. Accordingly, a tool using the polycrystalline cubic boron nitride can have a long tool life even in high load machining of an iron material or a material that is difficult to cut.

In the path of FIG. 4, a step of holding for 10 minutes or more at a temperature and a pressure in a region that simultaneously satisfies Formula 1, Formula 2, and Formula 3 is included. That is, compared with the path of FIG. 2, in the path of FIG. 4, the temperature and the pressure in the heating and pressurizing path are held for 10 minutes or more at a temperature and a pressure that is in the stable region of wurtzite boron nitride and that is closer to the stable region of hexagonal boron nitride (that is, a temperature and a pressure near the boundary between the stable region of wurtzite boron nitride and the stable region of hexagonal boron nitride). As a result, in the path of FIG. 4, compared with the path of FIG. 2, lattice defects occur even more easily, and it is thought that since the polycrystalline cubic boron nitride obtained in the path of FIG. 4 has more lattice defects in the polycrystalline body and a larger strain than the polycrystalline cubic boron nitride obtained in the path of FIG. 2, strength is further improved. Therefore, a tool using the polycrystalline cubic boron nitride obtained in the path of FIG. 4 can have a longer tool life even in high load machining of an iron material or a material that is difficult to cut.

In the path of FIG. 4, after a step of holding for 10 minutes or more at a temperature and a pressure in a region that simultaneously satisfies Formula 1, Formula 2, and Formula 3, the pressure is further increased in the stable region of wurtzite boron nitride (in FIG. 4, about 13 GPa) (arrow C3), and then that temperature (250° C.) and pressure (about 13 GPa) are held for 1 minute or more (c2 in FIG. 4). That is, in the path of FIG. 4, after a step of holding for 10 minutes or more at a temperature and a pressure that simultaneously satisfy Formula 1, Formula 2 and Formula 3, a step of further holding for one minute at a temperature and a pressure in a region that satisfies the following Formula 2 and Formula 4 is included.

$$P \leq -0.085T + 117 \qquad \text{Formula 2:}$$

$$P > -0.0037T + 11.375 \qquad \text{Formula 4:}$$

Therefore, in the path of FIG. 4, the conversion rate from hexagonal boron nitride to wurtzite boron nitride is even better than in the path of FIG. 3, and as a result, the conversion rate to cubic boron nitride is further improved. Accordingly, compared with the polycrystalline cubic boron nitride obtained by the path of FIG. 3, the polycrystalline cubic boron nitride obtained by the path of FIG. 4 has an increased cubic boron nitride content and is less likely to be damaged during machining. Therefore, a tool using the polycrystalline cubic boron nitride can have an even longer tool life even in high-load machining of an iron material and a material that is difficult to cut.

In the path of FIG. 4, the boron nitride polycrystalline body obtained in the second step is held for 3 minutes or more and 60 minutes or less under conditions of a temperature of 1700° C. or more and 2500° C. or less and a pressure of 8 GPa or more. As a result of this step, the obtained polycrystalline cubic boron nitride has an increased cubic boron nitride content and can achieve an even longer tool life.

EXAMPLES

The embodiments will now be described more specifically by way of Examples. However, the present invention is not limited to these Examples.

Example 1

In Example 1, the relationship among the production conditions of a polycrystalline cubic boron nitride, the structure (composition, median diameter of crystal grains, and dislocation density) of the obtained polycrystalline cubic boron nitride, and tool life when performing high load machining of a material that is difficult to cut with a tool using the polycrystalline cubic boron nitride was investigated.

<Production of Polycrystalline Cubic Boron Nitride>

The polycrystalline cubic boron nitrides of Sample 1-1 to Sample 9 were manufactured according to the following procedure.

(First Step)

Six grams of a hexagonal boron nitride powder ("Denka Boron Nitride" (trade name) manufactured by Denka Company Limited, grain size 5 μm) was prepared. The hexagonal boron nitride powder was placed into a molybdenum capsule and arranged in an ultrahigh pressure and high temperature generator.

(Second Step and Third Step)

[Sample 1-1, Sample 1-3, Sample 2-2, Sample 3-2, and Sample 4 to Sample 9]

Using the above-described hexagonal boron nitride powder and ultrahigh pressure and high temperature generator, the temperature and/or pressure were increased from the temperature and pressure shown in the "temperature" and "pressure" columns of the "starting point" in Table 1 to the "attainment temperature" and "attainment pressure" columns of the "first stage", and held there for the length of time shown in the "holding time" column.

Then, while maintaining the temperature, the pressure was increased to the pressure shown in the "attainment pressure" column of the "second stage" in Table 1, and held there for the length of time shown in the "holding time" column.

Then, while maintaining the pressure, the temperature was increased to the temperature shown in the "attainment temperature" column of the "third stage" in Table 1 and held there for the length of time shown in the "holding time" column, whereby polycrystalline cubic boron nitride was obtained. In Sample 1-1, Sample 1-3, Sample 2-2, Sample 3-2, and Sample 4 to Sample 9, the high temperature/high pressure treatment at the "attainment temperature", "attainment pressure", and "holding time" shown in the "third stage" corresponds to the third step.

[Sample 1-2]

Using the above-described hexagonal boron nitride powder and ultrahigh pressure and high temperature generator, while maintaining the temperature at the temperature shown in the "temperature" column of the "starting point" in Table 1, the pressure was increased from the pressure shown in the "pressure" column of the "starting point" to the "attainment pressure" column of the "first stage", and held there for the length of time shown in the "holding time" column.

Then, while maintaining the pressure, the temperature was increased to the temperature shown in the "attainment temperature" column of the "second stage" in Table 1 and held there for the length of time shown in the "holding time" column, whereby polycrystalline cubic boron nitride was obtained. In Sample 1-2, the high temperature/high pressure treatment at the "attainment temperature", "attainment pressure", and "holding time" shown in the "second stage" corresponds to the third step.

[Sample 2-1, Sample 2-3, Sample 3-1, and Sample 3-3]

Using the above-described hexagonal boron nitride powder and ultrahigh pressure and high temperature generator, the temperature and pressure were increased from the temperature and pressure shown in the "temperature" and "pressure" columns of the "starting point" in Table 1 to the "attainment temperature" and "attainment pressure" columns of the "first stage", and held there for the length of time shown in the "holding time" column.

Then, while maintaining the temperature, the pressure was increased to the pressure shown in the "attainment pressure" column of the "second stage" in Table 1, and held there for the length of time shown in the "holding time" column.

Then, while maintaining the temperature, the pressure was increased to the pressure shown in the "attainment pressure" column of the "third stage" in Table 1, and held there for the length of time shown in the "holding time" column.

Then, while maintaining the pressure, the temperature was increased to the temperature shown in the "attainment temperature" column of the "fourth stage" in Table 1, and held there for the length of time shown in the "holding time" column, whereby a polycrystalline cubic boron nitride was obtained. In Sample 2-1, Sample 2-3, Sample 3-1, and Sample 3-3, the high temperature and high pressure treatment at the "attainment temperature" and "attainment pressure" for the "holding time" shown in the "fourth stage" corresponds to the third step.

<Evaluation>

(Measurement of Composition)

The content of the cubic boron nitride in the obtained polycrystalline cubic boron nitrides was measured by X-ray diffraction. Since the specific X-ray diffraction method is as shown in the first embodiment, a description thereof will not be repeated here. The results are shown in the "cBN content" column of Table 1.

In all the samples, components other than cBN, wBN, and compressed hBN were not identified.

(Measurement of Dislocation Density)

The dislocation density of the cubic boron nitride in the obtained polycrystalline cubic boron nitrides was calculated by using the modified Williamson-Hall method and the modified Warren-Averbach method to analyze the line profile obtained by X-ray diffraction measurement. The specific method for calculating the dislocation density is as described in the first embodiment, and therefore a description thereof will not be repeated here. The results are shown in the "Dislocation density" column of Table 1.

(Measurement of Median Diameter d50 of Crystal Grains)

The median diameter d50 of an equivalent circle diameter was measured for the crystal grains included in the obtained polycrystalline cubic boron nitrides. Since the specific method is as shown in the first embodiment, a description thereof will not be repeated here. The results are shown in the "Median diameter (d50)" column of Table 1.

(Cutting Test)

The obtained polycrystalline cubic boron nitride was cut by a laser and finished to produce a cutting tool for an insert model number NU-CNGA120408 (manufactured by Sumitomo Electric Hardmetal Corp.). Using the obtained cutting tool, a Ti6Al4V round bar ($\phi$200 mm, with one V-shaped slit) was intermittently cut under the following cutting conditions to evaluate the tool life. The Ti6Al4V round bar, which is the work material, is a material that is difficult to cut.

(Cutting Conditions)

Work material: Ti6Al4V round bar ($\phi$200 mm, with one V-shaped slit)

Tool shape: Holder model number DCLNR2525 (manufactured by Sumitomo Electric Hardmetal Corp.)

Insert model number NU-CNGA120408 (manufactured by Sumitomo Electric Hardmetal Corp.)

Cutting speed: 180 m/min

Feed amount: 0.1 mm/blade

Depth of cut: 0.15 mm

Coolant: WET

The above cutting conditions correspond to high load machining of a material that is difficult to cut.

Cutting was conducted under the above-described cutting conditions, and the machining time until the amount of damage to the tool as observed from the flank reached 100 µm or more was measured as the tool life. A longer machining time indicates better damage resistance and a longer tool life. The results are shown in the "tool life" column of Table 1.

TABLE 1

| Sample No. | Starting point | | Heating and pressurizing path | | | | | | | | |
|---|---|---|---|---|---|---|---|---|---|---|---|
| | | | First stage | | | Second stage | | | Third stage | | |
| | Temperature (°C.) | Pressure (GPa) | Attainment temperature (°C.) | Attainment pressure (GPa) | Holding time (minutes) | Attainment temperature (°C.) | Attainment pressure (GPa) | Holding time (minutes) | Attainment temperature (°C.) | Attainment pressure (GPa) | Holding time (minutes) |
| 1-1 | 25 | 0 | 25 | 11.25 | 10 | 25 | 13 | 15 | 2000 | 13 | 15 |
| 1-2 | 25 | 0 | 25 | 13 | 15 | 2000 | 13 | 15 | — | — | — |
| 1-3 | 25 | 0 | 25 | 11.25 | 10 | 25 | 13 | 1 | 2000 | 13 | 15 |
| 2-1 | 25 | 0 | 250 | 0 | 5 | 250 | 10.40 | 10 | 250 | 13 | 15 |
| 2-2 | 25 | 0 | 250 | 0 | 5 | 250 | 13 | 15 | 2000 | 13 | 15 |
| 2-3 | 25 | 0 | 250 | 0 | 5 | 250 | 10.40 | 10 | 250 | 13 | 1 |
| 3-1 | 25 | 0 | 350 | 0 | 5 | 350 | 10.05 | 10 | 350 | 13 | 15 |
| 3-2 | 25 | 0 | 350 | 0 | 5 | 350 | 13 | 15 | 2000 | 13 | 15 |
| 3-3 | 25 | 0 | 350 | 0 | 5 | 350 | 10.05 | 10 | 350 | 13 | 1 |
| 4 | 25 | 0 | 450 | 0 | 5 | 450 | 13 | 15 | 2000 | 13 | 15 |
| 5 | 25 | 0 | 550 | 0 | 5 | 550 | 13 | 15 | 2000 | 13 | 15 |
| 6 | 25 | 0 | 700 | 0 | 5 | 700 | 13 | 15 | 2000 | 13 | 15 |
| 7 | 25 | 0 | 450 | 0 | 5 | 450 | 11 | 15 | 2000 | 11 | 15 |
| 8 | 25 | 0 | 450 | 0 | 5 | 450 | 9.6 | 15 | 2000 | 9.6 | 15 |
| 9 | 25 | 0 | 450 | 0 | 5 | 450 | 13 | 1 | 2000 | 13 | 15 |

| Sample No. | Heating and pressurizing path | | | wBN Stable region entry temperature (°C.) | Polycrystalline cubic boron nitride | | | Evaluation Tool life (minutes) |
|---|---|---|---|---|---|---|---|---|
| | Fourth stage | | | | cBN content (% by volume) | Median diameter (d50) (μm) | cBN dislocation density (×$10^{15}$/m²) | |
| | Attainment temperature (°C.) | Attainment pressure (GPa) | Holding time (minutes) | | | | | |
| 1-1 | — | — | — | 25 | 99.7 | 0.25 | 10.9 | 70 |
| 1-2 | — | — | — | 25 | 99.5 | 0.25 | 10.5 | 60 |
| 1-3 | — | — | — | 25 | 99.4 | 0.25 | 10.7 | 65 |
| 2-1 | 2000 | 13 | 15 | 250 | 99.6 | 0.25 | 9.5 | 58 |
| 2-2 | — | — | — | 250 | 99.5 | 0.24 | 9.2 | 55 |
| 2-3 | 2000 | 13 | 15 | 250 | 99.5 | 0.24 | 9.3 | 56 |
| 3-1 | 2000 | 13 | 15 | 350 | 99.5 | 0.25 | 9.0 | 50 |
| 3-2 | — | — | — | 350 | 99.4 | 0.25 | 8.8 | 45 |
| 3-3 | 2000 | 13 | 15 | 350 | 99.4 | 0.24 | 8.9 | 47 |
| 4 | — | — | — | 450 | 99.4 | 0.26 | 8.1 | 40 |
| 5 | — | — | — | 550 | 99.5 | 0.25 | 7.7 | 15 |
| 6 | — | — | — | 700 | 99.4 | 0.23 | 5.0 | 10 |
| 7 | — | — | — | 450 | 98.7 | 0.23 | 8.2 | 35 |
| 8 | — | — | — | 460 | 98.3 | 0.20 | 8.2 | 10 |
| 9 | — | — | — | 450 | 98.2 | 0.25 | 8.3 | 5 |

<Consideration>

[Sample 1-1 to Sample 1-3]

The method for manufacturing of each of Sample 1-1 to Sample 1-3 corresponds to the Example. The polycrystalline cubic boron nitrides of Sample 1-1 to Sample 1-3 all included 98.5% by volume or more of cubic boron nitride, had a cubic boron nitride dislocation density of more than $8 \times 10^{15}$/m², and had a median diameter d50 of the crystal grains of 0.1 μm or more and 0.5 μm or less, and hence correspond to the Example. It was confirmed that a tool using the polycrystalline cubic boron nitrides of Sample 1-1 to Sample 1-3 had a long tool life even in high load machining of a material that is difficult to cut.

Comparing the tool life of Sample 1-1 to Sample 1-3, Sample 1-1 and Sample 1-3 had a longer tool life than Sample 1-2. It is thought that this is because for Sample 1-1 and Sample 1-3, the attainment temperature and the attainment pressure in the first stage were a temperature and a pressure that simultaneously satisfy Formula 1, Formula 2, and Formula 3, and a step of holding for 10 minutes or more at that temperature and pressure was included, whereas for Sample 1-2, which did not include such a step, lattice defects tended to occur, and strength was large.

In addition, comparing the tool life of Sample 1-1 and Sample 1-3, Sample 1-1 had a longer tool life than Sample 1-3. It is thought that this is because Sample 1-1 had a longer holding time at the attainment temperature and attainment pressure in the second stage (that is, in the stable region of wurtzite boron nitride) than Sample 1-3, and therefore the conversion rate from hexagonal boron nitride to wurtzite boron nitride was further improved, and as a result, resulting in a higher conversion rate to cubic boron nitride than for Sample 1-3, and a larger cubic boron nitride content.

[Sample 2-1 to Sample 2-3]

The method for manufacturing of each of Sample 2-1 to Sample 2-3 corresponds to the Example. The polycrystalline cubic boron nitrides of Sample 2-1 to Sample 2-3 all included 98.5% by volume or more of cubic boron nitride, had a cubic boron nitride dislocation density of more than $8 \times 10^{15}$/m², and had a median diameter d50 of the crystal grains of 0.1 μm or more and 0.5 μm or less, and hence correspond to the Example. It was confirmed that a tool using the polycrystalline cubic boron nitrides of Sample 2-1 to Sample 2-3 had a long tool life even in high load machining of a material that is difficult to cut.

Comparing the tool life of Sample 2-1 to Sample 2-3, Sample 2-1 and Sample 2-3 had a longer tool life than Sample 2-2. It is thought that this is because for Sample 2-1 and Sample 2-3, the attainment temperature and the attainment pressure in the second stage were a temperature and a pressure that simultaneously satisfy Formula 1, Formula 2, and Formula 3, and a step of holding for 10 minutes or more at that temperature and pressure was included, whereas for Sample 2-2, which did not include such a step, lattice defects tended to occur, and strength was large.

In addition, comparing the tool life of Sample 2-1 and Sample 2-3, Sample 2-1 had a longer tool life than Sample 2-3. It is thought that this is because Sample 2-1 had a longer holding time at the attainment temperature and attainment pressure in the third stage (that is, in the stable region of wurtzite boron nitride) than Sample 2-3, and therefore the conversion rate from hexagonal boron nitride to wurtzite boron nitride was further improved, resulting in a higher conversion rate to cubic boron nitride than for Sample 2-3, and a larger cubic boron nitride content.

[Sample 3-1 to Sample 3-3]

The method for manufacturing of each of Sample 3-1 to Sample 3-3 corresponds to the Example. The polycrystalline cubic boron nitrides of Sample 3-1 to Sample 3-3 all included 98.5% by volume or more of cubic boron nitride, had a cubic boron nitride dislocation density of more than $8 \times 10^{15}/m^2$, and had a median diameter d50 of the crystal grains of 0.1 µm or more and 0.5 µm or less, and hence correspond to the Example. It was confirmed that a tool using the polycrystalline cubic boron nitrides of Sample 3-1 to Sample 3-3 had a long tool life even in high load machining of a material that is difficult to cut.

Comparing the tool life of Sample 3-1 to Sample 3-3, Sample 3-1 and Sample 3-3 had a longer tool life than Sample 3-2. It is thought that this is because for Sample 3-1 and Sample 3-3, the attainment temperature and the attainment pressure in the second stage were a temperature and a pressure that simultaneously satisfy Formula 1, Formula 2, and Formula 3, and a step of holding for 10 minutes or more at that temperature and pressure was included, whereas for Sample 3-2, which did not include such a step, lattice defects tended to occur, and strength was large.

In addition, comparing the tool life of Sample 3-1 and Sample 3-3, Sample 3-1 had a longer tool life than Sample 3-3. It is thought that this is because Sample 3-1 had a longer holding time at the attainment temperature and attainment pressure in the third stage (that is, in the stable region of wurtzite boron nitride) than Sample 3-3, and therefore the conversion rate from hexagonal boron nitride to wurtzite boron nitride was further improved, resulting in a higher conversion rate to cubic boron nitride than for Sample 3-3, and a larger cubic boron nitride content.

[Sample 4 and Sample 7]

The method for manufacturing of both of Sample 4 and Sample 7 corresponds to the Example. The polycrystalline cubic boron nitrides of Sample 4 and Sample 7 each included 98.5% by volume or more of cubic boron nitride, had a cubic boron nitride dislocation density of more than $8 \times 10^{15}/m^2$, and had a median diameter d50 of the crystal grains of 0.1 µm or more and 0.5 µm or less, and hence correspond to the Example. It was confirmed that a tool using the polycrystalline cubic boron nitrides of Sample 4 and Sample 7 had a long tool life even in high load machining of a material that is difficult to cut.

Comparing the tool life of Sample 4 and Sample 7, Sample 4 had a longer tool life than Sample 7. It is thought that this is because for Sample 4, the pressure in the third step was higher and the cubic boron nitride content was larger than for Sample 7.

[Sample 5 and Sample 6]

The method for manufacturing of both of Sample 5 and Sample 6 corresponds to a Comparative Example in which the entry temperature into the stable region of wurtzite boron nitride is more than 500° C. The polycrystalline cubic boron nitrides of Sample 5 and Sample 6 each had a cubic boron nitride dislocation density of $8 \times 10^{15}/m^2$ or less, which corresponds to a Comparative Example. A tool using the polycrystalline cubic boron nitrides of Sample 5 and Sample 6 had a short tool life. It is thought that this is because in the method for manufacturings of Sample 5 and Sample 6, the entry temperature into the stable region of wurtzite boron nitride was more than 500° C., so lattice defects did not easily occur, the obtained polycrystalline cubic boron nitride had a small dislocation density, and strength deteriorated.

[Sample 8]

The method for manufacturing of Sample 8 corresponds to a Comparative Example that does not include a step of holding for 10 minutes or more at a temperature and a pressure in the stable region of wurtzite boron nitride. The polycrystalline cubic boron nitride of Sample 8 had a cubic boron nitride content of 98.3% by volume, which corresponds to a Comparative Example. A tool using the polycrystalline cubic boron nitride of Sample 8 had a short tool life. It is thought that this is because the method for manufacturing of Sample 8 does not include a step of holding for 10 minutes or more at a temperature and a pressure in the stable region of wurtzite boron nitride, the conversion rate from hexagonal boron nitride to wurtzite boron nitride is low, resulting in a lower conversion rate to cubic boron nitride, and a small cubic boron nitride content in the obtained polycrystalline cubic boron nitride. Further, it is also thought that, compared with Sample 4 and Sample 7, since the method for manufacturing of Sample 8 had a lower sintering pressure in the third step, the conversion rate to cubic boron nitride was lower and the cubic boron nitride content in the obtained polycrystalline cubic boron nitride was smaller, and as a result the polycrystalline cubic boron nitride of Sample 8 had a shorter tool life than Sample 4 and Sample 7.

[Sample 9]

The method for manufacturing of Sample 9 corresponds to a Comparative Example that does not include a step of holding for 10 minutes or more at a temperature and a pressure in the stable region of wurtzite boron nitride. The polycrystalline cubic boron nitride of Sample 9 had a cubic boron nitride content of 98.2% by volume, which corresponds to a Comparative Example. A tool using the polycrystalline cubic boron nitride of Sample 9 had a short tool life. It is thought that this is because the method for manufacturing of Sample 9 does not include a step of holding for 10 minutes or more at a temperature and a pressure in the stable region of wurtzite boron nitride, the conversion rate from hexagonal boron nitride to wurtzite boron nitride is low, resulting in a lower conversion rate to cubic boron nitride, and a small cubic boron nitride content in the obtained polycrystalline cubic boron nitride. Further, it is also thought that, compared with Sample 4, since the method for manufacturing of Sample 9 had a shorter holding time in the stable region of wurtzite boron nitride, the conversion rate to cubic boron nitride was lower and the cubic boron nitride content in the obtained polycrystalline cubic boron nitride was smaller, and as a result the polycrystalline cubic boron nitride of Sample 9 had a shorter tool life than Sample 4.

Example 2

In Example 2, the relationship among the production conditions of a polycrystalline cubic boron nitride, the structure (composition, median diameter of crystal grains, and dislocation density) of the obtained polycrystalline cubic boron nitride, and tool life when performing high load machining of an iron material with a tool using the polycrystalline cubic boron nitride was investigated.

<Production of Polycrystalline Cubic Boron Nitride>

The polycrystalline cubic boron nitrides of Sample 10 to Sample 16 were manufactured according to the following procedure.

(First Step)

Six grams of a commercially available hexagonal boron nitride powder (grain size 5 μm) was prepared. The hexagonal boron nitride powder was placed into a molybdenum capsule and arranged in an ultrahigh pressure and high temperature generator.

(Second Step and Third Step)

[Sample 1 to Sample 16]

Using the above-described hexagonal boron nitride powder and ultrahigh pressure and high temperature generator, while maintaining the pressure at the pressure shown in the "pressure" column of the "starting point" in Table 1, the temperature was increased from the temperature shown in the "temperature" column to the "attainment temperature" column of the "first stage", and held there for the length of time shown in the "holding time" column.

Then, while maintaining the temperature, the pressure was increased to the pressure shown in the "attainment pressure" column of the "second stage" in Table 1, and held there for the length of time shown in the "holding time" column.

Then, while maintaining the pressure, the temperature was increased to the temperature shown in the "attainment temperature" column of the "third stage" in Table 1, and held there for the length of time shown in the "holding time" column, whereby a polycrystalline cubic boron nitride was obtained. It is noted that the high temperature and high pressure treatment at the "attainment temperature" and "attainment pressure" for the "holding time" shown in the "third stage" corresponds to the third step.

<Evaluation>

(Measurement of Composition)

The content of the cubic boron nitride in the obtained polycrystalline cubic boron nitrides was measured by X-ray diffraction. Since the specific X-ray diffraction method is as shown in the first embodiment, a description thereof will not be repeated here. The results are shown in the "cBN content" column of Table 2.

(Measurement of Dislocation Density)

The dislocation density of the cubic boron nitride in the obtained polycrystalline cubic boron nitrides was calculated by using the modified Williamson-Hall method and the modified Warren-Averbach method to analyze the line profile obtained by X-ray diffraction measurement. The specific method for calculating the dislocation density is as described in the first embodiment, and therefore a description thereof will not be repeated here. The results are shown in the "dislocation density" column of Table 2.

(Measurement of Median Diameter d50 of Crystal Grains)

The median diameter d50 of an equivalent circle diameter was measured for the crystal grains included in the obtained polycrystalline cubic boron nitrides. Since the specific method is as shown in the first embodiment, a description thereof will not be repeated here. The results are shown in the "median diameter (d50)" column of Table 2.

(Cutting Test)

The obtained polycrystalline cubic boron nitride was cut by a laser and finished to produce a cutting tool for an insert model number SNEW1203ADTR (manufactured by Sumitomo Electric Hardmetal Corp.). Using the obtained cutting tool, face milling of a gray cast iron FC300 block material (80 mm×300 mm×150 mm) was performed under the following cutting conditions to evaluate the tool life.

(Cutting Conditions)

Work material: Gray cast iron FC300 block material (80 mm×300 mm×150 mm)
Tool shape: Cutter model number FMU4100R (manufactured by Sumitomo Electric Hardmetal Corp.)
Insert model number SNEW1203ADTR (manufactured by Sumitomo Electric Hardmetal Corp.)
Cutting speed: 2400 m/min
Feed amount: 0.15 mm/blade
Depth of cut: 0.4 mm
Coolant: DRY The above cutting conditions correspond to high load machining of an iron material.

Cutting was conducted under the above-described cutting conditions, and the machining time until the amount of damage to the tool as observed from the flank reached 250 μm or more was measured as the tool life. A longer machining time indicates better damage resistance and a longer tool life. The results are shown in the "tool life" column of Table 2.

TABLE 2

| | | | Heating and pressurizing path | | | | | |
| | | | First stage | | | Second stage | | |
| | Starting point | | Attainment | Attainment | Holding | Attainment | Attainment | Holding |
| Sample No. | Temperature (° C.) | Pressure (GPa) | temperature (° C.) | pressure (GPa) | time (minutes) | temperature (° C.) | pressure (GPa) | time (minutes) |
| 10 | 25 | 0 | 200 | 0 | 5 | 200 | 15 | 15 |
| 11 | 25 | 0 | 200 | 0 | 5 | 200 | 15 | 15 |
| 12 | 25 | 0 | 200 | 0 | 5 | 200 | 15 | 15 |
| 13 | 25 | 0 | 200 | 0 | 5 | 200 | 15 | 15 |
| 14 | 25 | 0 | 200 | 0 | 5 | 200 | 15 | 15 |
| 15 | 25 | 0 | 200 | 0 | 5 | 200 | 15 | 15 |
| 16 | 25 | 0 | 1000 | 0 | 5 | 1000 | 15 | 15 |

TABLE 2-continued

| | Heating and pressurizing path | | | | Polycrystalline cubic boron nitride | | | |
| --- | --- | --- | --- | --- | --- | --- | --- | --- |
| | Third stage | | | wBN Stable | cBN | Median | cBN | |
| Sample No. | Attainment temperature (° C.) | Attainment pressure (GPa) | Holding time (minutes) | region entry temperature (° C.) | content (% by volume) | diameter (d50) (μm) | dislocation density (×10$^{15}$/m$^2$) | Evaluation Tool life (minutes) |
| 10 | 2300 | 15 | 2 | 200 | 98.8 | 0.08 | 9.4 | 110 |
| 11 | 2300 | 15 | 11 | 200 | 99.0 | 0.15 | 9.4 | 150 |
| 12 | 2300 | 15 | 25 | 200 | 99.2 | 0.46 | 9.5 | 180 |
| 13 | 2300 | 15 | 70 | 200 | 99.1 | 0.59 | 9.5 | 100 |
| 14 | 1650 | 15 | 11 | 200 | 98.8 | 0.09 | 9.4 | 115 |
| 15 | 2550 | 15 | 25 | 200 | 99.2 | 0.60 | 9.5 | 90 |
| 16 | 2300 | 15 | 25 | 1000 | 99.3 | 0.45 | 6.6 | 20 |

<Consideration>

[Sample 10]

The method for manufacturing of Sample 10 corresponds to a Comparative Example in which the holding time in the third stage (third step) is less than 3 minutes (2 minutes). The polycrystalline cubic boron nitride of Sample 10 has a median diameter d50 of the crystal grains of less than 0.1 μm (0.08 μm), which corresponds to a Comparative Example. A tool using the polycrystalline cubic boron nitride of Sample 10 had a short tool life. This is thought to be because in Sample 10 the holding time in the third step was short, grain growth was insufficient, and the median diameter d50 of the crystal grain decreased.

[Sample 11 and Sample 12]

The method for manufacturing of both of Sample 11 and Sample 12 corresponds to the Example. The polycrystalline cubic boron nitrides of Sample 11 and Sample 12 each included 98.5% by volume or more of cubic boron nitride, had a cubic boron nitride dislocation density of more than 8×10$^{15}$/m$^2$, and had a median diameter d50 of the crystal grains of 0.1 μm or more and 0.5 μm or less, and hence correspond to the Example. It was confirmed that a tool using the polycrystalline cubic boron nitrides of Sample 11 and Sample 12 had a long tool life even in high load machining of an iron material.

[Sample 13]

The method for manufacturing of Sample 13 corresponds to a Comparative Example in which the holding time in the third stage (third step) is more than 60 minutes (70 minutes). The polycrystalline cubic boron nitride of Sample 13 has a median diameter d50 of the crystal grains of more than 0.5 μm (0.59 μm), which corresponds to a Comparative Example. A tool using the polycrystalline cubic boron nitride of Sample 13 had a short tool life. This is thought to be because in Sample 13 the holding time in the third step was long, grain growth progressed too far, and the median diameter d50 of the crystal grain increased.

[Sample 14]

The method for manufacturing of Sample 14 corresponds to a Comparative Example in which the temperature in the third stage (third step) is less than 1700° C. (1650° C.). The polycrystalline cubic boron nitride of Sample 14 has a median diameter d50 of the crystal grains of less than 0.1 μm (0.09 μm), which corresponds to a Comparative Example. A tool using the polycrystalline cubic boron nitride of Sample 14 had a short tool life. This is thought to be because in Sample 14 the temperature in the third step was low, grain growth was insufficient, and the median diameter d50 of the crystal grain decreased.

[Sample 15]

The method for manufacturing of Sample 15 corresponds to a Comparative Example in which the temperature in the third stage (third step) is more than 2500° C. (2550° C.). The polycrystalline cubic boron nitride of Sample 15 has a median diameter d50 of the crystal grains of more than 0.5 μm (0.60 μm), which corresponds to a Comparative Example. A tool using the polycrystalline cubic boron nitride of Sample 15 had a short tool life. This is thought to be because in Sample 15 the temperature in the third step was high, grain growth progressed too far, and the median diameter d50 of the crystal grain increased.

[Sample 16]

The method for manufacturing of Sample 16 corresponds to a Comparative Example in which the entry temperature into the stable region of wurtzite boron nitride is more than 500° C. (1000° C.). The polycrystalline cubic boron nitride of Sample 16 had a cubic boron nitride dislocation density of 8×10$^{15}$/m$^2$ or less (6.6×10$^{15}$/m$^2$), which corresponds to a Comparative Example. A tool using the polycrystalline cubic boron nitride of Sample 16 had a short tool life. It is thought that this is because in Sample 16, the entry temperature into the stable region of wurtzite boron nitride was more than 500° C., so lattice defects did not easily occur, the small dislocation density was smaller, and strength deteriorated.

Example 3

In Example 3, the relationship between the content of alkali metal elements and alkaline earth metal elements in a polycrystalline cubic boron nitride and tool life when performing ultrafast high load machining of a material that is difficult to cut with a tool using the polycrystalline cubic boron nitride was investigated.

<Production of Polycrystalline Cubic Boron Nitride>

The polycrystalline cubic boron nitrides of Sample 17 to Sample 19 were manufactured according to the following procedure. Sample 17 was manufactured using the same raw material and by the same production steps as Sample 2-2, and the obtained polycrystalline cubic boron nitride was also the same as that of Sample 2-2.

(First Step)

[Sample 17 and Sample 18]

Six grams of a commercially available hexagonal boron nitride powder (grain size 5 μm) was prepared. The hexagonal boron nitride powder was placed into a molybdenum capsule and arranged in an ultrahigh pressure and high temperature generator.

[Sample 19]

A commercially available cubic boron nitride powder (average grain size 4 μm) was heat treated under an argon atmosphere at a temperature of 1900° C. for 1 hour to convert the cubic boron nitride back into hexagonal boron nitride to obtain a hexagonal boron nitride powder. The obtained hexagonal boron nitride powder was placed into a molybdenum capsule and arranged in an ultrahigh pressure and high temperature generator.

(Second Step and Third Step)

[Sample 17 to Sample 19]

Using the above-described hexagonal boron nitride powder and ultrahigh pressure and high temperature generator, while maintaining the pressure at the pressure shown in the "pressure" column of the "starting point" in Table 3, the temperature was increased from the temperature shown in the "temperature" column to the "attainment temperature" column of the "first stage", and held there for the length of time shown in the "holding time" column.

Then, while maintaining the temperature, the pressure was increased to the pressure shown in the "attainment pressure" column of the "second stage" in Table 3, and held there for the length of time shown in the "holding time" column.

Then, while maintaining the pressure, the temperature was increased to the temperature shown in the "attainment temperature" column of the "third stage" in Table 3, and held there for the length of time shown in the "holding time" column, whereby a polycrystalline cubic boron nitride was obtained. It is noted that the high temperature and high pressure treatment at the "attainment temperature" and "attainment pressure" for the "holding time" shown in the "third stage" corresponds to the third step.

<Evaluation>

(Measurement of Cubic Boron Nitride Content, Measurement of Dislocation Density, and Measurement of Median Diameter d50 of Crystal Grains)

The content of the cubic boron nitride, the dislocation density of the cubic boron nitride, and the median diameter d50 of the crystal grains in the obtained polycrystalline cubic boron nitrides were measured. Since the specific measurement methods are as shown in the first embodiment, a description thereof will not be repeated here. The results are shown in the "cBN content" column, the "cBN dislocation density" column, and the "median diameter (d50)" column of Table 3.

In all the samples, components other than cBN, wBN, and compressed hBN were not identified.

(Measurement of Total Content of Alkali Metal Elements and Alkaline Earth Metal Elements)

The total content of alkali metal elements and alkaline earth metal elements in the obtained polycrystalline cubic boron nitrides was measured by SIMS. Since the specific measurement method is as described in the first embodiment, a description thereof will not be repeated here. The total content of alkali metal elements and alkaline earth metal elements is shown in the "alkali metal/alkaline earth metal content" column of Table 3.

(Cutting Test)

The obtained polycrystalline cubic boron nitride was cut by a laser and finished to produce a cutting tool for an insert model number NU-CNGA120408 (manufactured by Sumitomo Electric Hardmetal Corp.). Using the obtained cutting tool, a Ti6Al4V round bar (ϕ200 mm, with one V-shaped slit) was intermittently cut under the following cutting conditions to evaluate the tool life. The Ti6Al4V round bar, which is the work material, is a material that is difficult to cut.

(Cutting Conditions)

Work material: Ti6Al4V round bar (ϕ200 mm, with one V-shaped slit)
Tool shape: Holder model number DCLNR2525 (manufactured by Sumitomo Electric Hardmetal Corp.)
Insert model number NU-CNGA120408 (manufactured by Sumitomo Electric Hardmetal Corp.)
Cutting speed: 250 m/min
Feed amount: 0.1 mm/blade
Depth of cut: 0.15 mm
Coolant: WET The above cutting conditions correspond to ultrafast high load machining of a material that is difficult to cut.

Cutting was conducted under the above-described cutting conditions, and the machining time until the amount of damage to the tool as observed from the flank reached 100 μm or more was measured as the tool life. A longer machining time indicates better damage resistance and a longer tool life. The results are shown in the "tool life" column of Table 3.

TABLE 3

| | | | Heating and pressurizing path | | | | | | |
| --- | --- | --- | --- | --- | --- | --- | --- | --- | --- |
| | | | First stage | | | Second stage | | | Third stage |
| | Starting point | | Attainment | Attainment | Holding | Attainment | Attainment | Holding | Attainment |
| Sample No. | Temperature (° C.) | Pressure (GPa) | temperature (° C.) | pressure (GPa) | time (minutes) | temperature (° C.) | pressure (GPa) | time (minutes) | temperature (° C.) |
| 17 | 25 | 0 | 250 | 0 | 5 | 250 | 13 | 15 | 2000 |
| 18 | 25 | 0 | 250 | 0 | 5 | 250 | 13 | 15 | 2000 |
| 19 | 25 | 0 | 250 | 0 | 5 | 250 | 13 | 15 | 2000 |

| | Heating and pressurizing path | | | Polycrystalline cubic boron nitride | | | | |
| --- | --- | --- | --- | --- | --- | --- | --- | --- |
| | Third stage | | wBN Stable | cBN | Median | cBN | Alkali | |
| Sample No. | Attainment pressure (GPa) | Holding time (minutes) | region entry temperature (° C.) | content (% by volume) | diameter (d50) (μm) | dislocation density (×10$^{15}$/m$^2$) | metal/alkaline earth metal (ppm) | Evaluation Tool life (minutes) |
| 17 | 13 | 15 | 250 | 99.5 | 0.24 | 9.2 | 2 | 25.0 |
| 18 | 13 | 15 | 250 | 99.6 | 0.25 | 9.1 | 8 | 22.5 |
| 19 | 13 | 15 | 250 | 99.6 | 0.27 | 9.1 | 20 | 15.0 |

<Consideration>
[Sample 17 to Sample 19]

The method for manufacturing of each of Sample 17 to Sample 19 corresponds to the Example. The polycrystalline cubic boron nitrides of Sample 17 to Sample 19 all included 98.5% by volume or more of cubic boron nitride, had a cubic boron nitride dislocation density of more than $8\times10^{15}/m^2$, and had a median diameter d50 of the crystal grains of 0.1 µm or more and 0.5 µm or less, and hence correspond to the Example. It was confirmed that a tool using the polycrystalline cubic boron nitrides of Sample 17 to Sample 19 achieved a long tool life of 15 minutes or more even in ultrafast high load machining of a material that is difficult to cut.

Sample 17 and Sample 18 had longer tool life than Sample 19. It is thought that this is because the polycrystalline cubic boron nitrides of Sample 17 and Sample 18 have a total content of alkali metal elements and alkaline earth metal elements of 10 ppm or less, conversion of cubic boron nitride to hexagonal boron nitride does not easily occur even when the interface between the blade edge and the work material under the cutting environment is a high temperature and a high pressure.

Sample 17 and Sample 18 differed in terms of their composition, total content of alkali metal elements and alkaline earth metal elements, median diameter d50 of the crystal grains, and dislocation density of the cubic boron nitride. It is thought that this is due to variations in, for example, the amount of impurities and the particle size of the raw material hexagonal boron nitride.

Example 4

In Example 4, the relationship between the content of compressed hexagonal boron nitride and wurtzite boron nitride in the polycrystalline cubic boron nitride and tool life when performing high load machining of a material that is difficult to cut with a tool using the polycrystalline cubic boron nitride was investigated.

<Production of Polycrystalline Cubic Boron Nitride>

The polycrystalline cubic boron nitrides of Sample 17 to Sample 19 were manufactured according to the following procedure.

(First Step)

Six grams of a commercially available hexagonal boron nitride powder (grain size 5 µm) was prepared. The hexagonal boron nitride powder was placed into a molybdenum capsule and arranged in an ultrahigh pressure and high temperature generator.

(Second Step and Third Step)

Using the above-described hexagonal boron nitride powder and ultrahigh pressure and high temperature generator, while maintaining the pressure at the pressure shown in the "pressure" column of the "starting point" in Table 4, the temperature was increased from the temperature shown in the "temperature" column to the "attainment temperature" column of the "first stage", and held there for the length of time shown in the "holding time" column.

Then, while maintaining the temperature, the pressure was increased to the pressure shown in the "attainment pressure" column of the "second stage" in Table 4, and held there for the length of time shown in the "holding time" column.

Then, while maintaining the pressure, the temperature was increased to the temperature shown in the "attainment temperature" column of the "third stage" in Table 4, and held there for the length of time shown in the "holding time" column, whereby a polycrystalline cubic boron nitride was obtained. The high temperature and high pressure treatment at the "attainment temperature" and "attainment pressure" for the "holding time" shown in the "third stage" corresponds to the third step.

<Evaluation>

(Measurement of Composition, Measurement of Dislocation Density, and Measurement of Median Diameter d50 of Crystal Grains)

The composition (content of cubic boron nitride, content of compressed hexagonal cubic boron nitride (hereinafter, also referred to as "comp. hBN"), and content of wurtzite boron nitride), the dislocation density of the cubic boron nitride, and the median diameter d50 of the crystal grains in the obtained polycrystalline cubic boron nitrides were measured. Since the specific measurement method is as described in the first embodiment, a description thereof will not be repeated here. The results are shown in the "cBN content" column, the "comp. hBN content" column, the "wBN content" column, the "cBN dislocation density" column, and the "median diameter (d50)" column of Table 4.

In all the samples, components other than cBN, wBN, and compressed hBN were not identified.

(Cutting Test)

The obtained polycrystalline cubic boron nitride was cut by a laser and finished to produce a cutting tool for an insert model number NU-CNGA120408 (manufactured by Sumitomo Electric Hardmetal Corp.). Using the obtained cutting tool, a Ti6Al4V round bar (φ200 mm, with one V-shaped slit) was intermittently cut under the following cutting conditions to evaluate the tool life. The Ti6Al4V round bar, which is the work material, is a material that is difficult to cut.

(Cutting Conditions)

Work material: Ti6Al4V round bar (φ200 mm, with one V-shaped slit)

Tool shape: Holder model number DCLNR2525 (manufactured by Sumitomo Electric Hardmetal Corp.)

Insert model number NU-CNGA120408 (manufactured by Sumitomo Electric Hardmetal Corp.)

Cutting speed: 120 m/min

Feed amount: 0.1 mm/blade

Depth of cut: 0.15 mm

Coolant: WET

The above cutting conditions correspond to high load machining of a material that is difficult to cut.

Cutting was conducted under the above-described cutting conditions, and the machining time until the amount of damage to the tool as observed from the flank reached 100 µm or more was measured as the tool life. A longer machining time indicates better damage resistance and a longer tool life. The results are shown in the "tool life" column of Table 4.

TABLE 4

| | Starting point | | Heating and pressurizing path | | | | | | |
|---|---|---|---|---|---|---|---|---|---|
| | | | First stage | | | Second stage | | | Third stage |
| Sample No. | Temperature (° C.) | Pressure (GPa) | Attainment temperature (° C.) | Attainment pressure (GPa) | Holding time (minutes) | Attainment temperature (° C.) | Attainment pressure (GPa) | Holding time (minutes) | Attainment temperature (° C.) |
| 20 | 25 | 0 | 450 | 0 | 5 | 450 | 13 | 20 | 2000 |
| 21 | 25 | 0 | 450 | 0 | 5 | 450 | 10 | 20 | 1900 |
| 22 | 25 | 0 | 450 | 0 | 5 | 450 | 10 | 20 | 2400 |
| 23 | 25 | 0 | 450 | 0 | 5 | 450 | 9.6 | 15 | 1800 |

| | Heating and pressurizing path | | | Polycrystalline cubic boron nitride | | | | | |
|---|---|---|---|---|---|---|---|---|---|
| | Third stage | | wBN Stable | comp. | | | | | |
| | | | | cBN | hBN | wBN | Median | cBN | |
| Sample No. | Attainment pressure (GPa) | Holding time (minutes) | region entry temperature (° C.) | content (% by volume) | content (% by volume) | content (% by volume) | diameter (d50) (μm) | dislocation density (×10$^{15}$/m$^2$) | Evaluation Tool life (minutes) |
| 20 | 13 | 15 | 450 | 99.4 | 0 | 0.6 | 0.26 | 8.2 | 40 |
| 21 | 10 | 15 | 450 | 98.6 | 0.2 | 1.3 | 0.25 | 8.7 | 45 |
| 22 | 10 | 15 | 450 | 100 | 0 | 0 | 0.29 | 8.1 | 30 |
| 23 | 9.6 | 15 | 460 | 98.2 | 0.2 | 1.8 | 0.18 | 8.8 | 15 |

<Consideration>

[Sample 20 to Sample 22]

The method for manufacturing of each of Sample 20 to Sample 22 corresponds to the Example. The polycrystalline cubic boron nitrides of Sample 20 to Sample 22 all included 98.5% by volume or more of cubic boron nitride, had a cubic boron nitride dislocation density of more than 8×10$^{15}$/m$^2$, and had a median diameter d50 of the crystal grains of 0.1 μm or more and 0.5 μm or less, and hence correspond to the Example. It was confirmed that a tool using the polycrystalline cubic boron nitrides of Sample 20 to Sample 22 achieved a long tool life even in high load machining of a material that is difficult to cut.

Sample 20 and Sample 21 had a longer tool life than Sample 22. It is thought that this is because the polycrystalline cubic boron nitrides of Sample 20 and Sample 21 included compressed hexagonal boron nitride and/or wurtzite boron nitride, and agglutination resistance and slidability were improved.

[Sample 23]

The method for manufacturing of Sample 23 corresponds to a Comparative Example that does not include a step of holding for 10 minutes or more at a temperature and a pressure in the stable region of wurtzite boron nitride. The polycrystalline cubic boron nitride of Sample 23 had a cubic boron nitride content of 98.2% by volume, which corresponds to a Comparative Example. A tool using the polycrystalline cubic boron nitride of Sample 23 had a short tool life. It is thought that this is because the method for manufacturing of Sample 23 does not include a step of holding for 10 minutes or more at a temperature and a pressure in the stable region of wurtzite boron nitride, the conversion rate from hexagonal boron nitride to wurtzite boron nitride is low, resulting in a lower conversion rate to cubic boron nitride, and a small cubic boron nitride content in the obtained polycrystalline cubic boron nitride.

Example 5

In Example 5, the relationship between the area ratio of plate-like particles in a polycrystalline cubic boron nitride and tool life when performing high load machining of an iron material with a tool using the polycrystalline cubic boron nitride was investigated.

<Production of Polycrystalline Cubic Boron Nitride>

The polycrystalline cubic boron nitrides of Sample 24 to Sample 28 were manufactured according to the following procedure.

(First Step)

Six grams of a commercially available hexagonal boron nitride powder (grain size 5 μm) was prepared. The hexagonal boron nitride powder was placed into a molybdenum capsule and arranged in an ultrahigh pressure and high temperature generator.

(Second Step and Third Step)

Using the above-described hexagonal boron nitride powder and ultrahigh pressure and high temperature generator, while maintaining the pressure at the pressure shown in the "pressure" column of the "starting point" in Table 5, the temperature was increased from the temperature shown in the "temperature" column to the temperature shown in the "attainment temperature" column of the "first stage", and held there for the length of time shown in the "holding time" column.

Then, while maintaining the temperature, the pressure was increased to the pressure shown in the "attainment pressure" column of the "second stage" in Table 5, and held there for the length of time shown in the "holding time" column.

Then, while maintaining the pressure, the temperature was increased to the temperature shown in the "attainment temperature" column of the "third stage" in Table 5, and held there for the length of time shown in the "holding time" column, whereby a polycrystalline cubic boron nitride was obtained. The high temperature and high pressure treatment at the "attainment temperature" and "attainment pressure" for the "holding time" shown in the "third stage" corresponds to the third step.

<Evaluation>

(Measurement of Cubic Boron Nitride Content, Measurement of Dislocation Density, and Measurement of Median Diameter d50 of Crystal Grains)

The content of the cubic boron nitride, the dislocation density of the cubic boron nitride, and the median diameter d50 of the crystal grains in the obtained polycrystalline cubic boron nitrides were measured. Since the specific measurement methods are as shown in the first embodiment, a description thereof will not be repeated here. The results are shown in the "cBN content" column, the "cBN dislocation density" column, and the "median diameter (d50)" column of Table 5.

Cutting was conducted under the above-described cutting conditions, and the machining time until the amount of damage to the tool as observed from the flank reached 250 μm or more was measured as the tool life. A longer machining time indicates better damage resistance and a longer tool life. The results are shown in the "tool life" column of Table 5.

TABLE 5

| | | | Heating and pressurizing path | | | | | | |
|---|---|---|---|---|---|---|---|---|---|
| | | | First stage | | | Second stage | | | Third stage |
| | Starting point | | Attainment | Attainment | Holding | Attainment | Attainment | Holding | Attainment |
| Sample No. | Temperature (° C.) | Pressure (GPa) | temperature (° C.) | pressure (GPa) | time (minutes) | temperature (° C.) | pressure (GPa) | time (minutes) | temperature (° C.) |
| 24 | 25 | 0 | 200 | 0 | 5 | 200 | 15 | 11 | 2320 |
| 25 | 25 | 0 | 200 | 0 | 5 | 200 | 15 | 11 | 2320 |
| 26 | 25 | 0 | 200 | 0 | 5 | 200 | 15 | 11 | 2320 |
| 27 | 25 | 0 | 200 | 0 | 5 | 200 | 15 | 11 | 2320 |
| 28 | 25 | 0 | 200 | 0 | 5 | 200 | 15 | 11 | 2320 |

| | Heating and pressurizing path | | | Polycrystalline cubic boron nitride | | | | |
|---|---|---|---|---|---|---|---|---|
| | Third stage | | wBN Stable | cBN | Median | Area ratio of plate-like | cBN | Evaluation |
| Sample No. | Attainment pressure (GPa) | Holding time (minutes) | region entry temperature (° C.) | content (% by volume) | diameter (d50) (μm) | particles (% in terms of surface area) | dislocation density (×10$^{15}$/m$^2$) | Tool life (minutes) |
| 24 | 15 | 11 | 200 | 99.0 | 0.15 | 1.9 | 9.4 | 145 |
| 25 | 15 | 14 | 200 | 99.2 | 0.23 | 4.6 | 9.5 | 130 |
| 26 | 15 | 22 | 200 | 99.1 | 0.25 | 5.5 | 9.4 | 120 |
| 27 | 15 | 20 | 200 | 99.1 | 0.31 | 28 | 9.3 | 110 |
| 28 | 15 | 35 | 200 | 99.1 | 0.35 | 31 | 9.2 | 95 |

In all the samples, components other than cBN, wBN, and compressed hBN were not identified.

(Measurement of Area Ratio of Plate-Like Particles)

The area ratio of the plate-like particles of the obtained polycrystalline cubic boron nitride was measured. Since the specific measurement method is as described in the first embodiment, a description thereof will not be repeated here. The results are shown in the "area ratio of plate-like particles" column of Table 5.

(Cutting Test)

The obtained polycrystalline cubic boron nitride was cut by a laser and finished to produce a cutting tool for an insert model number SNEW1203ADTR (manufactured by Sumitomo Electric Hardmetal Corp.). Using the obtained cutting tool, face milling of a gray cast iron FC300 block material (80 mm×300 mm×150 mm) was performed under the following cutting conditions to evaluate the tool life.

(Cutting Conditions)
Work material: Gray cast iron FC300 block material (80 mm×300 mm×150 mm)
Tool shape: Cutter model number FMU4100R (manufactured by Sumitomo Electric Hardmetal Corp.)
Insert model number SNEW1203ADTR (manufactured by Sumitomo Electric Hardmetal Corp.)
Cutting speed: 2250 m/min
Feed amount: 0.13 mm/blade
Depth of cut: 0.45 mm
Coolant: DRY The above cutting conditions correspond to high load machining of an iron material.

[Samples 24 to Sample 28]

The method for manufacturing of each of Sample 24 to Sample 28 corresponds to the Example. The polycrystalline cubic boron nitrides of Sample 24 to Sample 28 all included 98.5% by volume or more of cubic boron nitride, had a cubic boron nitride dislocation density of more than $8\times10^{15}/m^2$, and had a median diameter d50 of the crystal grains of 0.1 μm or more and 0.5 μm or less, and hence correspond to the Example. It was confirmed that a tool using the polycrystalline cubic boron nitrides of Sample 24 to Sample 28 had a long tool life even in high load machining of an iron material.

Comparing Sample 24 to Sample 28, it was confirmed that tool life tends to be longer as the smaller the area ratio of the plate-like particles is. It is thought that this is because the smaller the area ratio of the plate-like particles, the more difficult it is for sudden blade edge damage due to the plate-like particles to occur.

Although embodiments and Examples of the present disclosure have been described above, from the beginning it has been planned that various configurations of the above-described embodiments and Examples may be appropriately combined and variously modified.

The embodiments and Examples disclosed this time are to be considered as illustrative in all points and are not restrictive. The scope of the present disclosure is shown not by the embodiments and examples described above but by the claims, and it is intended meanings equivalent to the claims and all modifications are also included within the scope of the present disclosure.

The invention claimed is:

1. A polycrystalline cubic boron nitride comprising 98.5% by volume or more of cubic boron nitride, wherein
the cubic boron nitride has a dislocation density of more than $8\times10^{15}/m^2$,
the polycrystalline cubic boron nitride comprises a plurality of crystal grains,
the plurality of crystal grains have a median diameter d50 of an equivalent circle diameter of 0.1 μm or more and 0.5 μm or less, and when a cross-section of the polycrystalline cubic boron nitride is observed at a magnification of 10000× using a scanning electron microscope, an area ratio of plate-like particles having an aspect ratio of 4 or more is 30% or less in terms of surface area.

2. The polycrystalline cubic boron nitride according to claim 1, wherein the dislocation density is $9\times10^{15}/m^2$ or more.

3. The polycrystalline cubic boron nitride according to claim 1, wherein the polycrystalline cubic boron nitride comprises a total content of an alkali metal element and an alkaline earth metal element of 10 ppm or less in terms of mass.

4. The polycrystalline cubic boron nitride according to claim 1, wherein the area ratio of the plate-like particles having an aspect ratio of 4 or more is 5% or less in terms of surface area.

5. The polycrystalline cubic boron nitride according to claim 1, wherein the polycrystalline cubic boron nitride comprises 0.01% by volume or more of compressed hexagonal boron nitride.

6. The polycrystalline cubic boron nitride according to claim 1, wherein the polycrystalline cubic boron nitride comprises 0.1% by volume or more of wurtzite boron nitride.

7. The polycrystalline cubic boron nitride according to claim 1, wherein the dislocation density is calculated by using a modified Williamson-Hall method and a modified Warren-Averbach method.

8. The polycrystalline cubic boron nitride according to claim 1, wherein the dislocation density is measured using synchrotron radiation as an X-ray source.

9. A method for manufacturing the polycrystalline cubic boron nitride according to claim 1, comprising:
a first step of preparing a hexagonal boron nitride powder;
a second step of heating and pressurizing the hexagonal boron nitride powder to a temperature greater than or equal to 1700° C. and less than or equal to 2500° C. and to a pressure greater than or equal to 8 GPa, with the temperature and the pressure passing through a temperature and a pressure in a stable region of a wurtzite boron nitride, to obtain a boron nitride polycrystalline body; and
a third step of holding the boron nitride polycrystalline body obtained in the second step for 3 minutes or more and 60 minutes or less under conditions of a temperature of 1700° C. or more and 2500° C. or less and a pressure of 8 GPa or more to obtain the polycrystalline cubic boron nitride, wherein
the stable region of wurtzite boron nitride is, when the temperature is represented as T° C. and the pressure as P GPa, a region that simultaneously satisfies the following Formula 1 and Formula 2, $$P \geq -0.0037T+11.301 \quad \text{Formula 1}$$

$$P \leq -0.085T+117 \quad \text{Formula 2}$$

in a heating and pressurizing path of the second step, an entry temperature into the stable region of wurtzite boron nitride is 500° C. or less, and
the second step comprises a step of holding the temperature and the pressure in the heating and pressurizing path for 10 minutes or more at a temperature and a pressure in the stable region of wurtzite boron nitride.

10. The method for manufacturing the polycrystalline cubic boron nitride according to claim 9, wherein the entry temperature is 300° C. or less.

11. The method for manufacturing the polycrystalline cubic boron nitride according to claim 9, wherein the second step comprises a step of holding the temperature and the pressure in the heating and pressurizing path for 15 minutes or more at a temperature and a pressure in the stable region of wurtzite boron nitride.

12. The method for manufacturing the polycrystalline cubic boron nitride according to claim 9, wherein the second step comprises a step of, when the temperature is represented as T° C. and the pressure as P GPa, holding the temperature and the pressure in the heating and pressurizing path for 10 minutes or more at a temperature and a pressure in a region that simultaneously satisfies the following Formula 1, Formula 2, and Formula 3:

$$P \geq -0.0037T+11.301 \quad \text{Formula 1}$$

$$P \leq -0.085T+117 \quad \text{Formula 2}$$

$$P \leq -0.0037T+11.375 \quad \text{Formula 3.}$$

* * * * *